United States Patent
Shoshan et al.

(10) Patent No.: US 10,659,966 B2
(45) Date of Patent: May 19, 2020

(54) SYSTEM, METHOD AND COMPUTER PROGRAM PRODUCT FOR ESTABLISHING A PRIVATE CELLULAR NETWORK

(71) Applicant: ELTA SYSTEMS LTD., Ashdod (IL)

(72) Inventors: Yaakov Shoshan, Ashkelon (IL); Benjamin Giloh, Yaad (IL); Itay Sherman, Hod Hasharon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

(21) Appl. No.: 16/502,613

(22) Filed: Jul. 3, 2019

(65) Prior Publication Data

US 2020/0021997 A1 Jan. 16, 2020

(30) Foreign Application Priority Data

Jul. 15, 2018 (IL) .......................... 260623

(51) Int. Cl.
*H04W 16/12* (2009.01)
*H04W 16/18* (2009.01)
(Continued)

(52) U.S. Cl.
CPC ......... *H04W 16/12* (2013.01); *H04J 11/0073* (2013.01); *H04J 11/0076* (2013.01);
(Continued)

(58) Field of Classification Search
CPC ..... H04W 16/12; H04W 48/16; H04W 16/18; H04J 11/0076; H04J 11/0086; H04J 11/0073; H04J 2011/0096
See application file for complete search history.

(56) References Cited

U.S. PATENT DOCUMENTS

| 7,979,884 B1 * | 7/2011 | Schwartzman | ..... H04L 12/4633 725/101 |
| 9,769,871 B2 | 9/2017 | Giloh | |

(Continued)

FOREIGN PATENT DOCUMENTS

| EP | 2643993 A1 | 10/2013 |
| EP | 2918023 A4 | 9/2016 |

(Continued)

OTHER PUBLICATIONS

Alcatel Lucent, "The LTE Network Architecture", Strategic White Paper, 2009, 26 pages.

(Continued)

*Primary Examiner* — Lewis G West
(74) *Attorney, Agent, or Firm* — Dorsey & Whitney LLP

(57) ABSTRACT

A method for converting a conventional cellular network e.g. having nodes equipped with conventional modems operating in accordance with a cellular communication protocol e.g. LTE and storing first orthogonal sequences, into a private cellular network, including coupling an (e.g. external) device to only nodes sought for the private cellular network, the device storing second orthogonal sequences not hard-coded in the modems, the device storing a one-to-one correspondence enabling translation of each second orthogonal sequence, to one of the first sequences. at least when in a private network supporting mode, a device associated with a transmitting node sought for the private network, uses a processor to determine which first orthogonal sequence is being used, translate that sequence using the one-to-one correspondence into a second orthogonal sequence, and use the translated sequence to transmit a synchronization signal.

15 Claims, 11 Drawing Sheets

(51) Int. Cl.
*H04J 11/00* (2006.01)
*H04W 48/16* (2009.01)

(52) U.S. Cl.
CPC ......... *H04J 11/0086* (2013.01); *H04W 16/18* (2013.01); *H04W 48/16* (2013.01); *H04J 2011/0096* (2013.01)

(56) References Cited

U.S. PATENT DOCUMENTS

| | | | |
|---|---|---|---|
| 2005/0088999 A1* | 4/2005 | Waylett | H04W 88/10 370/338 |
| 2009/0245221 A1* | 10/2009 | Piipponen | H04W 88/06 370/343 |
| 2010/0093401 A1 | 4/2010 | Moran et al. | |
| 2010/0120468 A1 | 5/2010 | Moran et al. | |
| 2015/0270889 A1 | 9/2015 | Shoshan et al. | |
| 2016/0316416 A1* | 10/2016 | Raval | H04W 48/02 |
| 2018/0343056 A1* | 11/2018 | Radulescu | H04B 7/2634 |

FOREIGN PATENT DOCUMENTS

| | | |
|---|---|---|
| EP | 2641424 B1 | 8/2019 |
| WO | 2009125388 A2 | 10/2009 |
| WO | 2012070049 A4 | 8/2012 |
| WO | 2012120519 A4 | 11/2012 |
| WO | 2016071904 A1 | 5/2016 |
| WO | 2016199144 A1 | 12/2016 |

OTHER PUBLICATIONS

Israel Aerospace Industries Ltd., "ELK-1888-Tac4G", https://web.archive.org/web/20180509040732/http://www.iai.co.il/2013/36570-45720-en/ELTA%20-%20Systems%20by%20Product%20Lines.aspx (Accessed May 9, 2018), Sep. 23, 2019, 2 pages.

lte-bullets.com, "Description of LTE Synchronization", https://web.archive.org/web/20170712225453/http://lte-bullets.com/LTE%20in%20Bullets%20-%20Synchronisation%20Signals.pdf, Jul. 2017, 3 pages.

teletopix.org, "How Synchronization Channel Works in LTE?", http://www.teletopix.org/4g-lte/how-synchronization-channel-works-in-lte/, (Accessed Sep. 23, 2019), 5 pages.

* cited by examiner

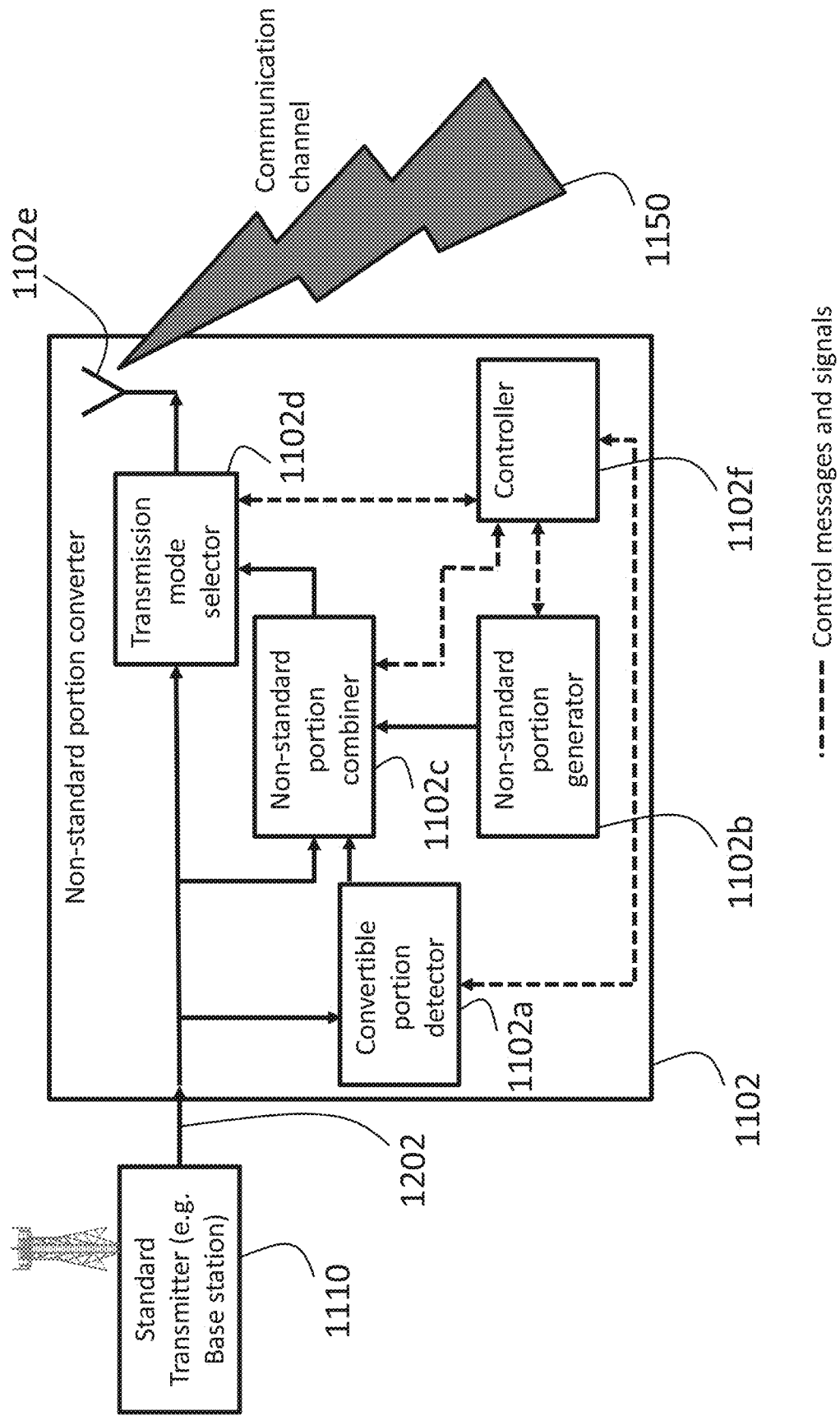

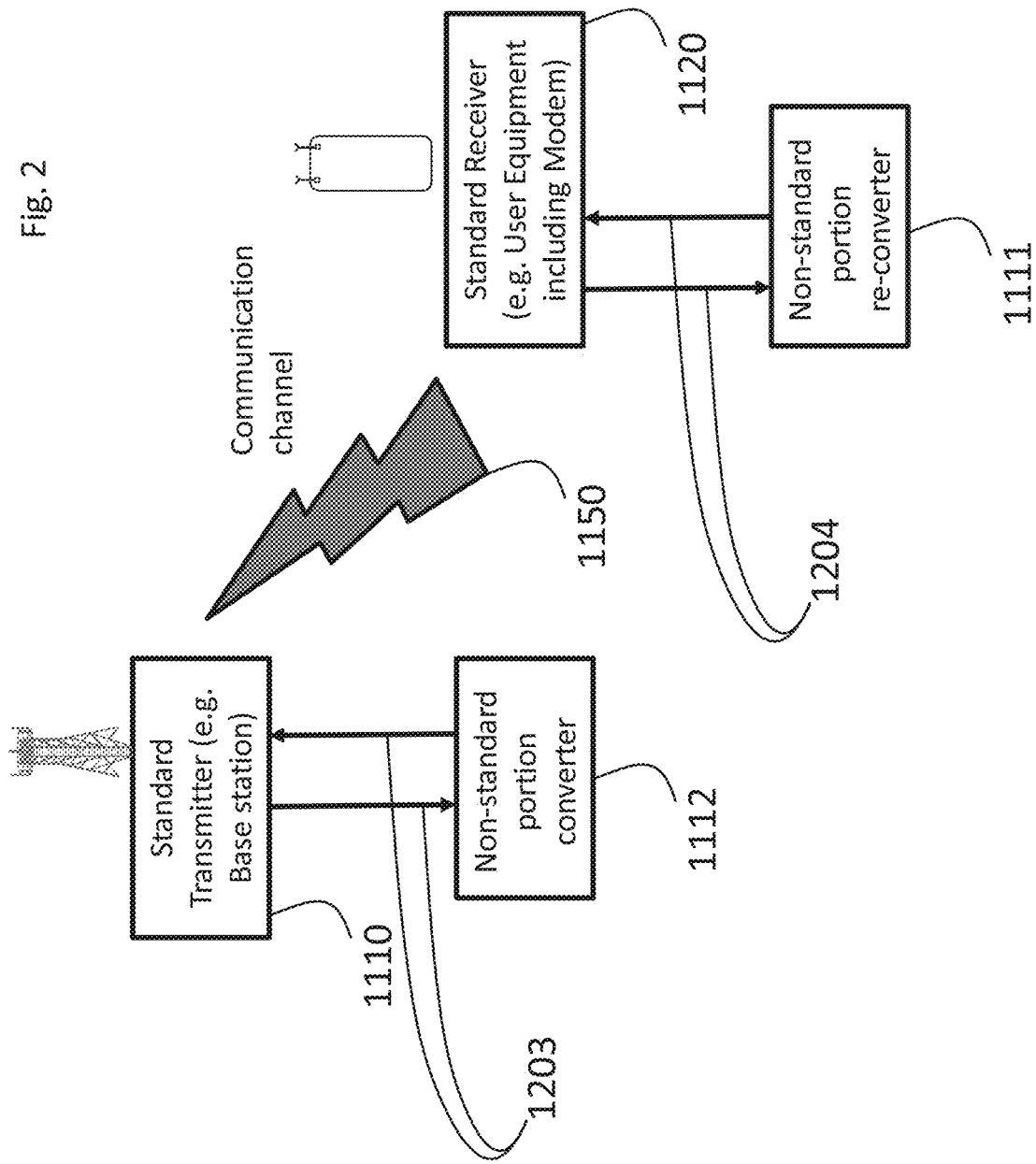

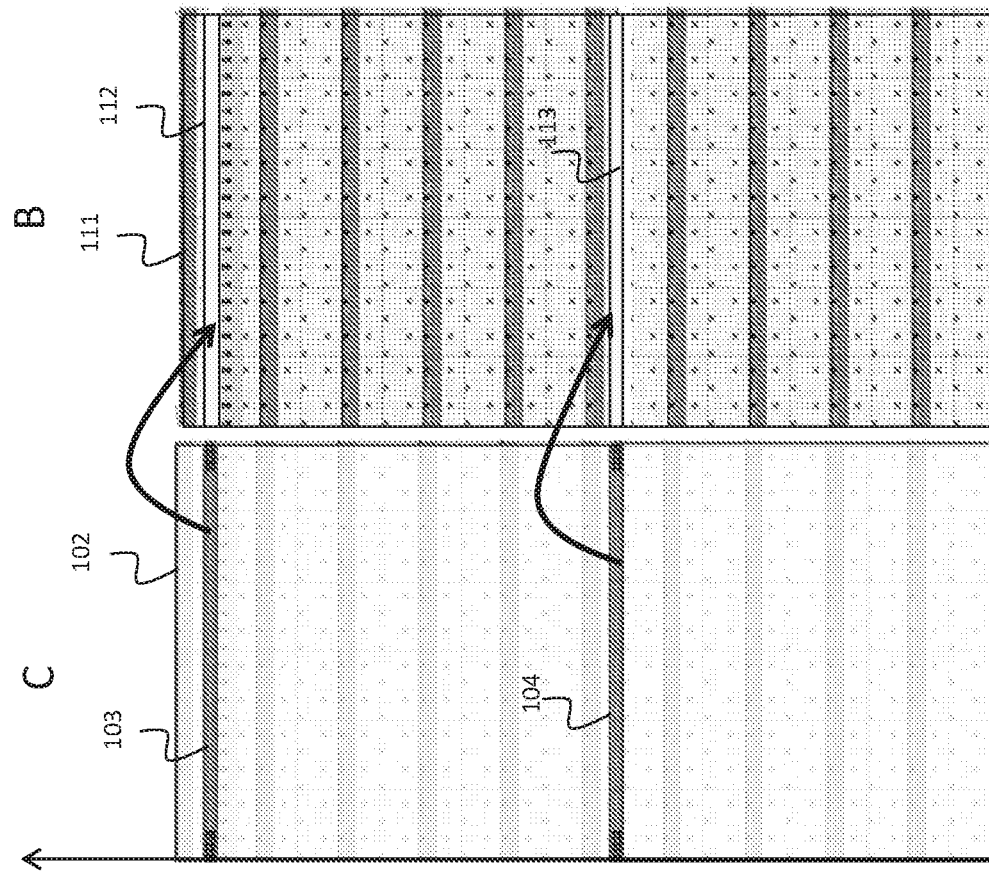
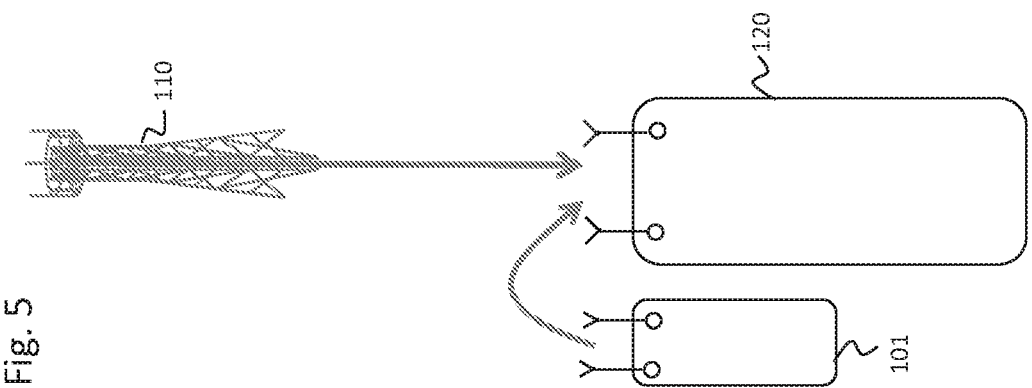

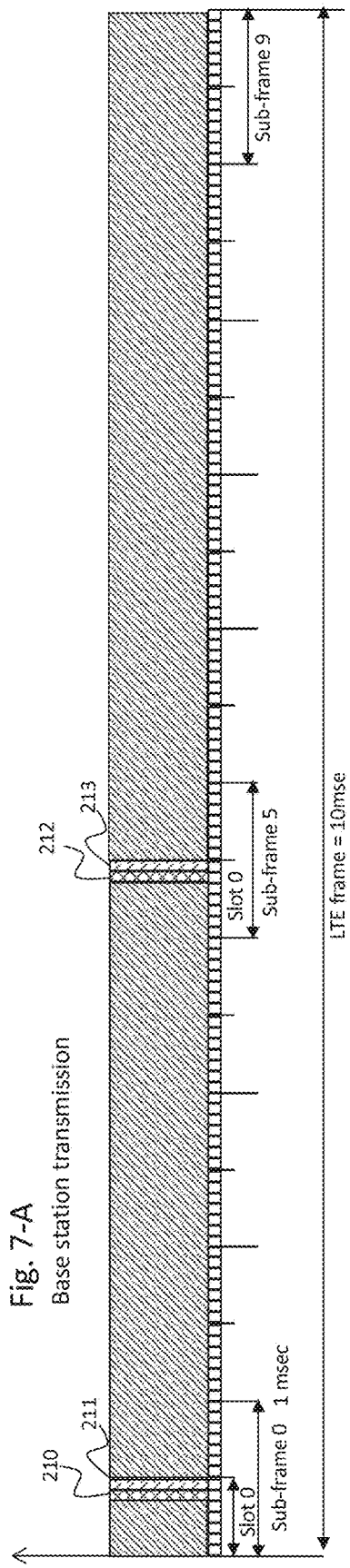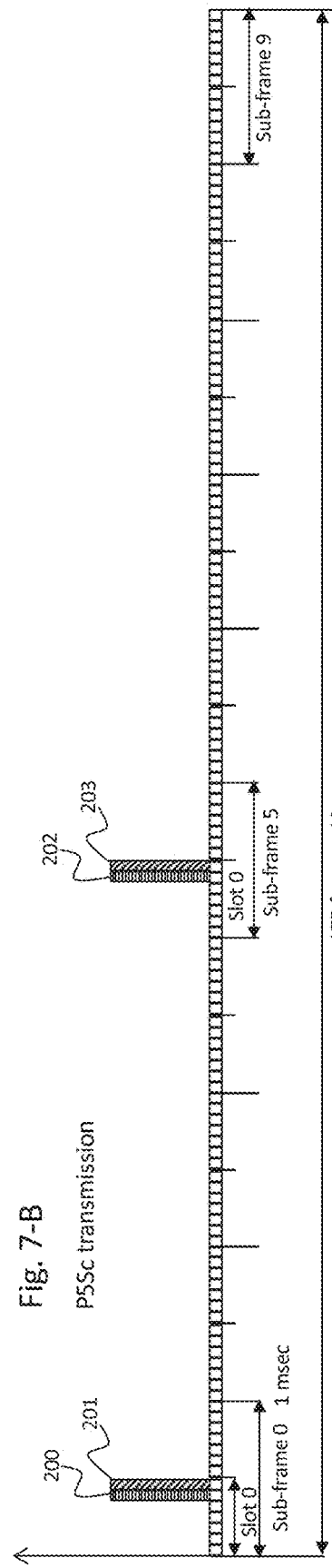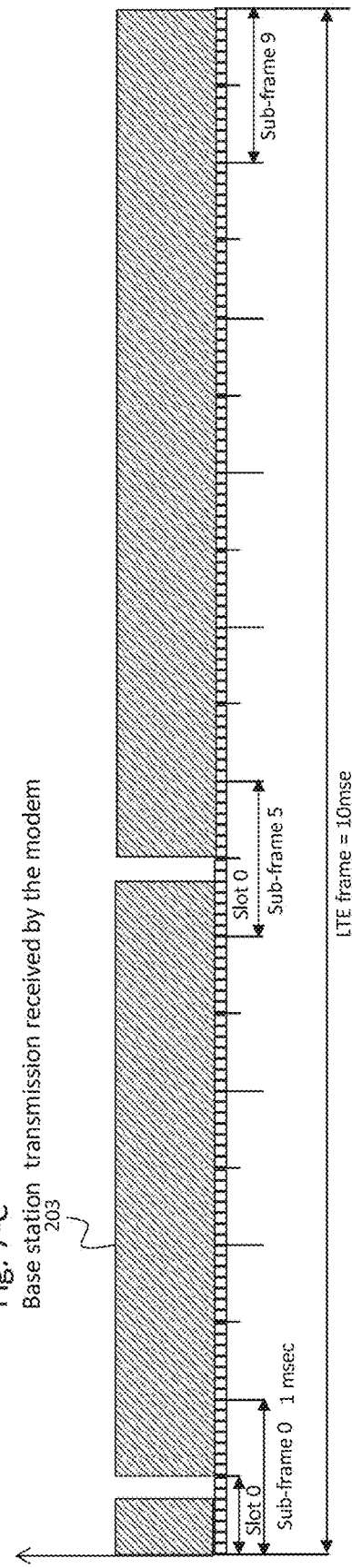

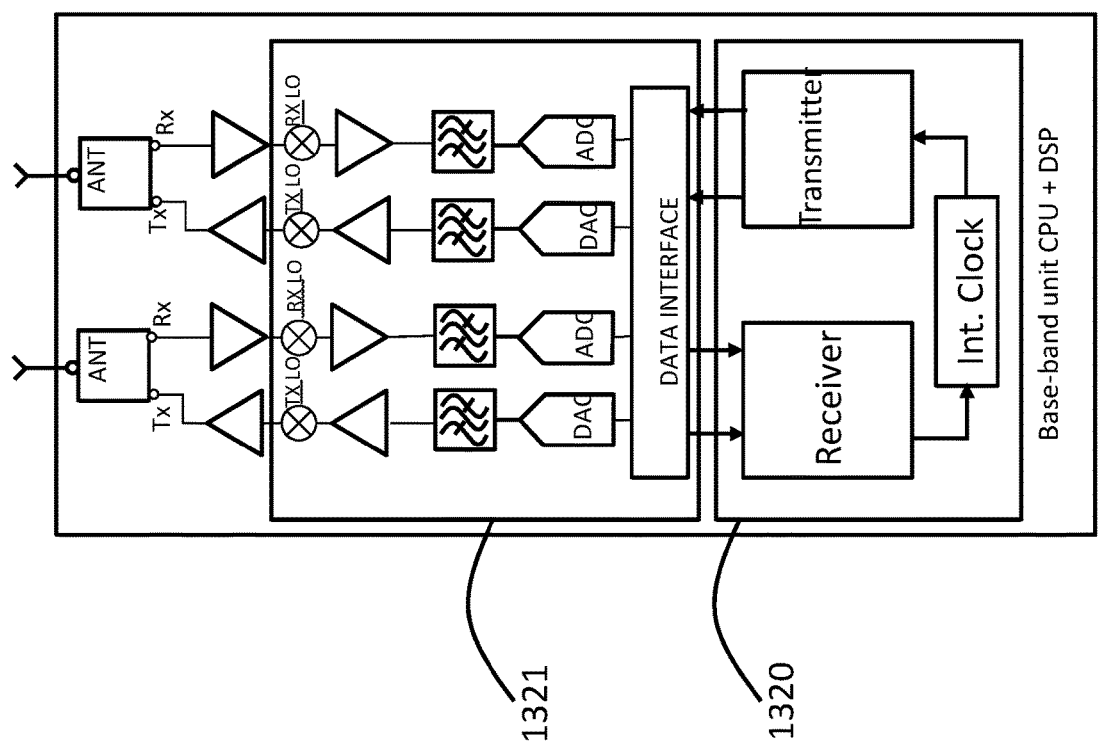
Fig. 8-B
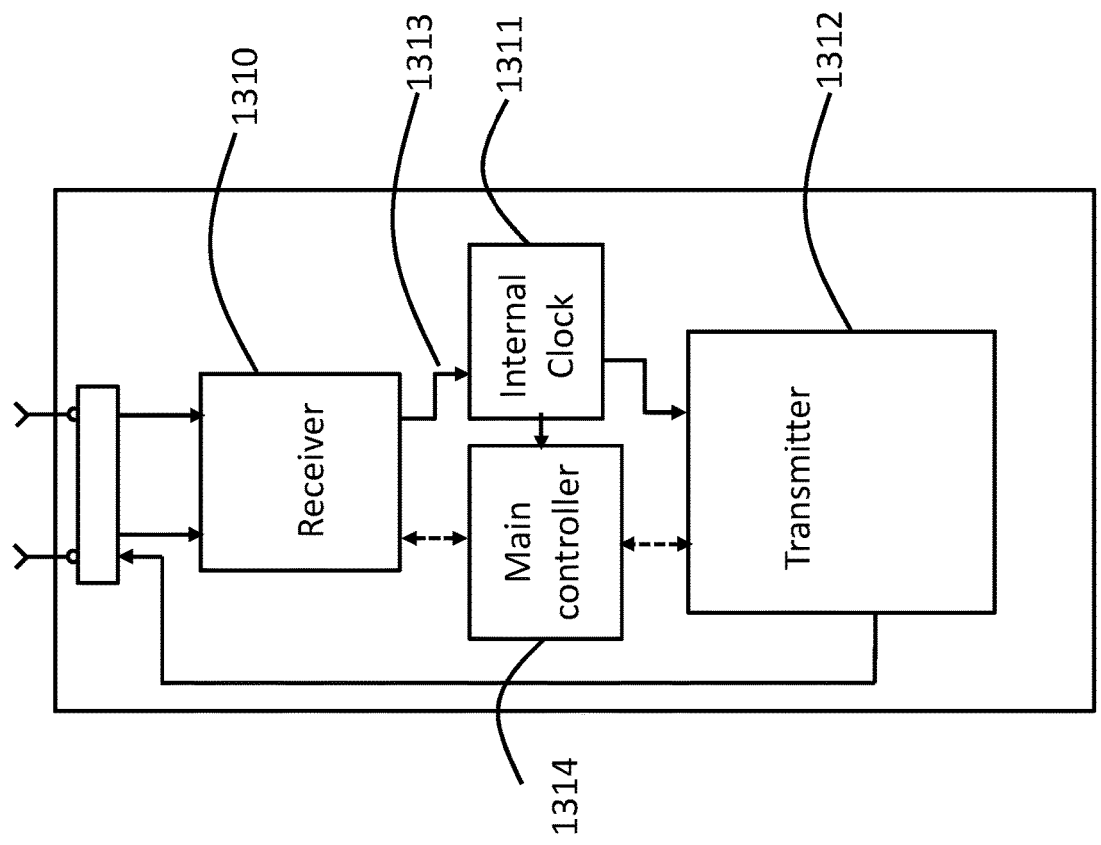
Fig. 8-A

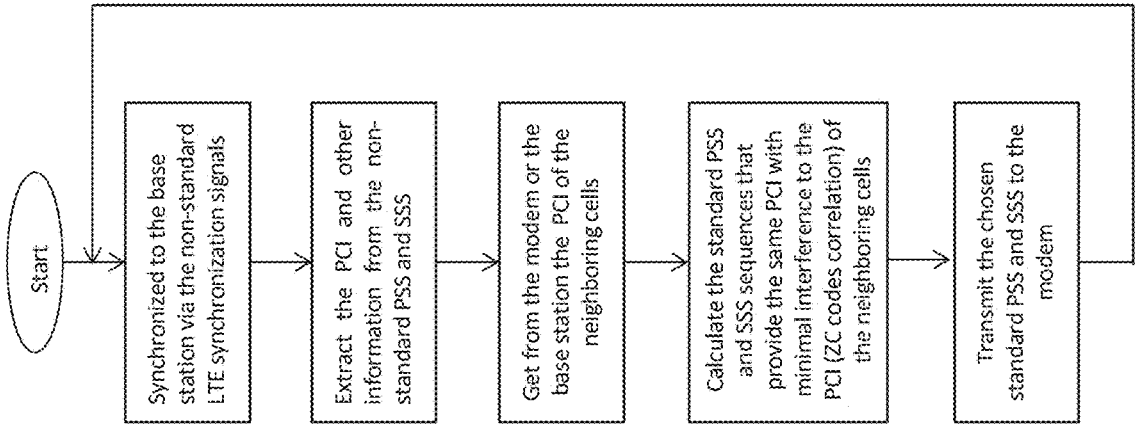
Fig. 9-B
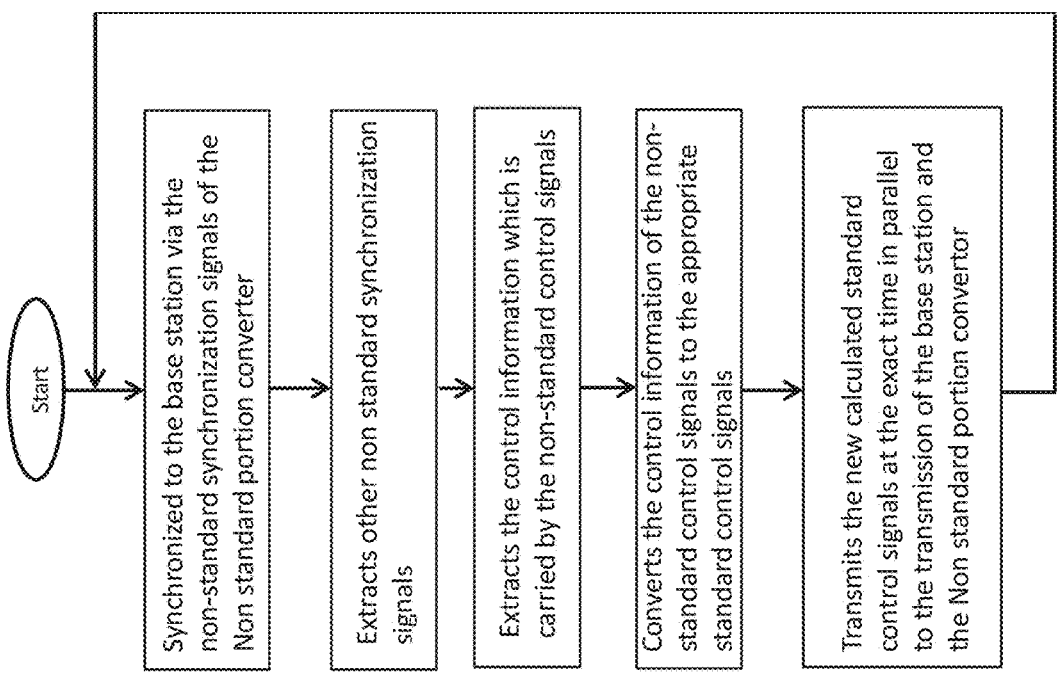
Fig. 9-A

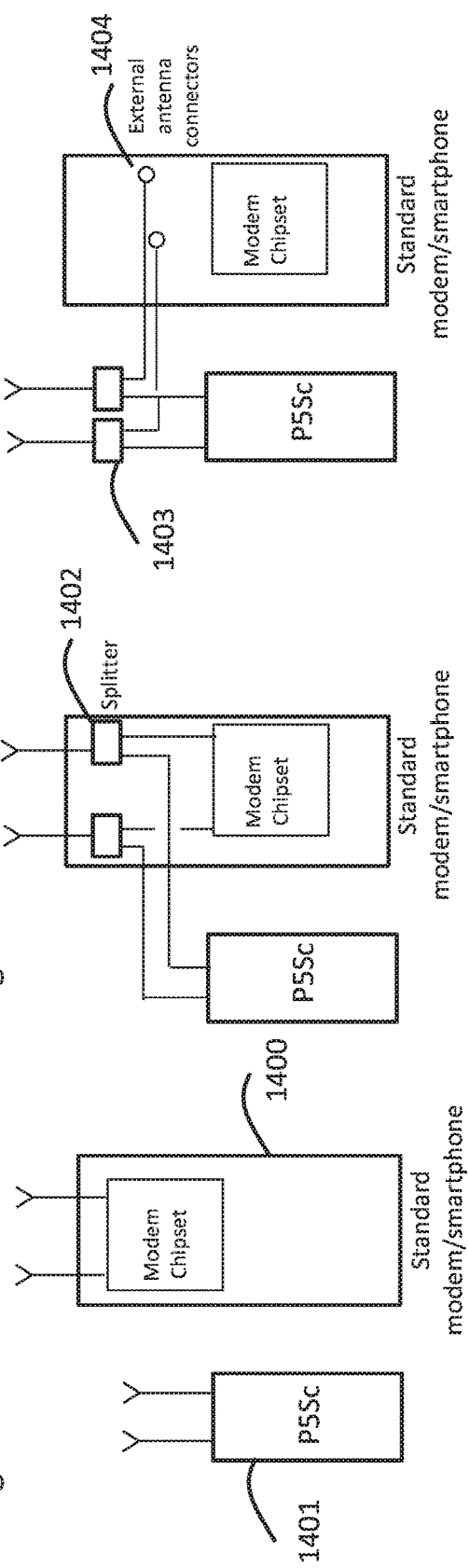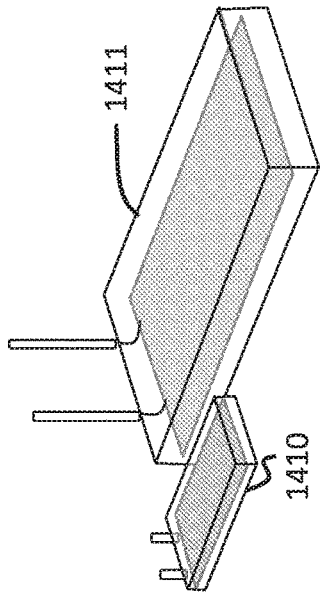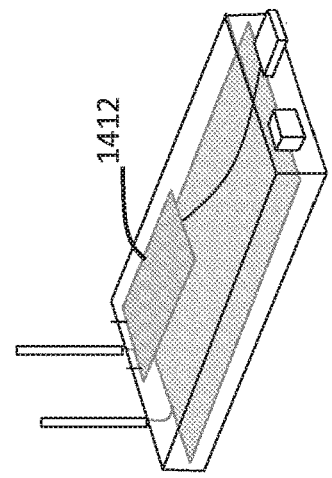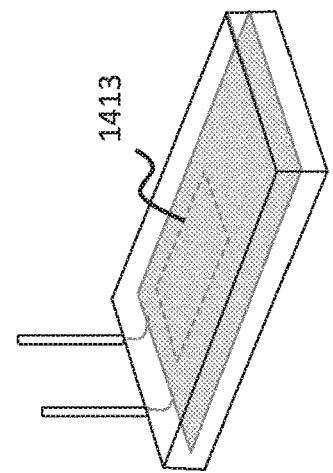

SYSTEM, METHOD AND COMPUTER PROGRAM PRODUCT FOR ESTABLISHING A PRIVATE CELLULAR NETWORK

FIELD OF THIS DISCLOSURE

The present invention relates generally to telecommunications, and more particularly to telecommunication equipment governed by an LTE protocol.

BACKGROUND FOR THIS DISCLOSURE

LTE technology is described inter alia in Alcatel-Lucent's Strategic White Paper entitled "The LTE Network Architecture—a comprehensive tutorial", first published as a chapter in LTE . . . From Theory to practice, Wiley 2009.

Spread spectrum techniques are common in cellular communication and include reversible transformation of a signal with a given bandwidth, spreading the signal's energy over a wider bandwidth. The transmitted signal typically has pseudorandom features and can be modulated by a receiver which is configured to generate the same pseudorandom sequence used by the transmitter. In CDMA, plural spread spectrum signals can be transmitted at the same time through the same channel, because they are uncorrelated (orthogonal), hence lack inter-channel interference. Spread spectrum techniques include direct sequence and frequency hopping. It is possible to generate a set of orthogonal codes (sequence of numbers) e.g. using Hadamard's method for obtaining a set of orthogonal codes.

EBay UK states that "regardless of the type of mobile phone, users can easily connect an external antenna to their phones. Antenna RF ports and antenna accessories are especially common among older cell models, though iPhone and smartphone owners can still take advantage of an instant wireless signal boosts. Fortunately, with a little know-how and the right accessories, connecting an external antenna to a mobile phone is a quick and easy process.

Location and Types of RF Ports

Most of the older cell phone models, such as the iconic Motorola RAZR, feature a RF port in the back of the phone that allows users to connect an external antenna. The first step in connecting an antenna to a mobile phone is to check for the RF port. In some Verizon phones, check behind the phone and near the antenna for a small rubber or plastic plug. If the antenna adapter does not fit into the back plug gently, then the RF may be underneath the phone's original antenna.

Another common location of the RF port is along the bottom of the phone. Bottom port connectors typically resemble a charger, and users can find a RF charger combination to boost signal and charge the phone at the same time. Other locations for the RF port include along the top or the side of the phone, or even within the phone's original antenna.

Finding the Right Antenna Adapter for a Mobile Phone
Finding the right antenna adapter for a mobile phone solely can be quite difficult, and it is important to know the phone model number and a corresponding adapter. The location of the RF port also determines the type of mobile phone adapter a user needs. Because the antenna adapter often runs from the RF port to the actual antenna, users should also examine the opposite end of the adapter cable.

Most mobile phone adapters feature an FME Male connector opposite the RF connector, and therefore to connect the adapter to an antenna, users need to get an antenna with an FME Female connector. For antennas that have a different connector, users can connect the adapter to the antenna with a FME Female to TNC Female adapter or a FME Female to Mini-UHF Female adapter.

. . . Universal Passive Antenna Adapters

Another option for smartphones that do not have RF ports is the universal passive antenna adapters. These adapters work like a normal antenna, whereas users have to connect the cell phone or signal amplifier to the antenna via a low loss cable. These antenna adapters connect to the back of a phone with a velcro pad. However, passive antenna adapters do not produce the strongest signal, and users often have to include a direct-connect amplifier between the antenna and the adapter in order to achieve a desirable signal.

. . . It is always important to . . . consult the phone's user manual to see if a particular external antenna model is compatible".

A cellphone antenna adapter enables an external cellphone antenna to be connected directly to a cellphone or cellular broadband PC Cards or HotSpot or Routers, thereby improving reception of a variety of phones e.g. Sony Ericsson, Novatel, Sierra Wireless, Pantech, UTStarcom, Audiovox, Nokia, Cingular, Sprint, Kyocera, Samsung, UTStarcom, HTC, LGIC, Motorola, Sony Ericsson, using a cell phone antenna adapter and an external cell phone antenna. On-line manuals explain how to couple, or attach, an antenna to the cellphone. Each PC Card or cellphone antenna adapter typically specifies a connector type e.g. TNC, Mini-UHF or FME which are the connectors that connect to an external antenna of the same type. For instance, a cell phone adapter whose description indicates TNC Female, connects to any antenna with a TNC Male connector. For example, Netgear 778S/779S Hotspot Dual External Antenna Adapter FME/SMA F is an external antenna adapter for Netgear 778S and 779S Mobile Hotspots which has two connectors for both ports on the Netgear Hotspots and two SMA Female connectors to go to two antennas or one MiMo Antenna. An adapter has FME Male connectors and comes with two screw-on SMA Female adapters.

Some smartphones support an external antenna such as:
Palmone Treo 600
Palmone Treo 650
Palm Treo 700w
HP iPAQ h6315
HP iPAQ hw6515) unofficial/unsupported
Cingular 2125, 8125 Pocket PC) unofficial/unsupported To connect an external antenna, an appropriate external antenna adapter cable may be used. anamplifier e.g. a Wilson Cellular Dual-Band Inline Amplifier Booster may be used to increase output power.

RIM BlackBerry phones and the Apple iPhone and iPhone 3G may not have antenna ports, but passive inductive antenna adapters are commercially available. Also, a power passive inductive solution, like the Wilson Cellular Signal-Boost, can be used.

Modu Mobile is a modular cellular device having the basic functionality of a cellphone e.g. antenna, cellular radio, contact list, text messaging capabilities and a battery, that can be inserted into multiple jackets aka sleeves (such as car stereos, photo frames, car navigation systems, clocks, toasters, laptops, cameras, keyboard, battery, pulse oximeter) that enhance the phone's functionality. By inserting the modular device into various jackets, users personalize their mobile phone's looks and features. The phone is packed with a large memory stick (1 G), that carries over an end-user's personal data (contacts, photos, music), onto other devices, using the jackets. Similarly, Project Ara is an open-source initiative for modular smartphones striving to support third-party hardware development for individual phone components, allowing an end-user to turn to one vendor to upgrade, say, her or his phone's processor, then to another vendor to upgrade the same phone's display.

Phonebloks, similarly, work on a concept for making phones modular.

In Project Ara modules are inserted into metal endoskeletal frames aka "endos". The frame is a switch to an on-device network linking all modules. Frames of a few different sizes are planned and have slots on the front for the display and other modules and on the back for more modules. Each slot on the frame accepts any module of the correct size. The front slots are of various heights and take up the entire width of the frame. The rear slots have standard sizes (1×1, 1×2 and 2×2). Data from the modules may be transferred at up to 10 gigabits/sec per connection. 2×2 modules have two connections and allow up to 20 gigabits/sec. Thus, these modules provide common smartphone features, such as cameras and speakers, as well as specialized features e.g. medical devices, receipt printers, laser pointers, pico projectors, night vision sensors, or game controller buttons. Modules may be hot-swapped without turning the phone off. Modules were originally to be secured with electro-permanent magnets, but this was replaced by a different method. The enclosures of the modules were planned to be 3D-printed, but instead became a customizable molded case.

Patent document EP2641424A4 to Dov Moran describes a cooperative tablet computer and mobile communicator. Portable telephone sets, e.g. cordless phones, mobile phones or bar type handsets comprise one or a plurality of mechanically detachable modules wherein the modules are operable in the detached state, e.g. one module for the user interface, and one module for the transceiver.

Modu's patent document US20100093401A1 describes a modular wireless communicator including a housing, wireless communication functionality located within the housing, native user interface functionality cooperating with the wireless communication functionality and including user interface surfaces located on at least one outer facing surface of the housing, and pouching responsive electrical interconnection functionality responsive to pouching orientation of the housing in a pouch of an enhanced function device for automatically causing the wireless communication functionality to adapt to interoperation with parenting user interface functionality forming part of the enhanced function device at least partially instead of with the native user interface functionality.

Modu's patent document US20100120468A1 describes a foldable mobile phone.

Modu's patent document WO2009125388A3 describes a modular cell phone for fixed mobile convergence.

"Moving" cellular networks which include at least one relay with both base station and mobile station functionality, are known. Such networks are described e.g. in the following patent documents:

Elta patent document U.S. Pat. No. 9,769,871 to Giloh describes a cellular communication system with moving base stations. Giloh's mobile communication network system comprises a core network including a core device and at least one static base station, base stations, and mobile stations communicating, via antennae, with the base stations. The base stations include at least one moving base station which communicates via antennae with the mobile stations and which has a physical e.g. Ethernet back-connection to a co-located radio manager having a physical connection with a co-located mobile station communicating via antennae with at least one selectable static base station, wherein each individual co-located radio manager comprises a radio resource manager and functionality for receiving information from, and sending information to, other respectively co-located radio managers regarding qualities of their respective connections back to the core network, quality of its own connection back to the core network and channel quality which other base stations are able to provide and which its own base station is able to provide, to mobile stations in the vicinity of the individual co-located radio manager, and for using the information to determine whether to reject at least one mobile station seeking to be served by an individual base station associated with said individual co-located radio manager.

Elta's patent document WO2016071904A1 describes an add-on modem for wireless devices, and a system for ex post facto upgrading of at least one Legacy personal communication device which includes a legacy modem lacking at least one desired wireless communication feature. An auxiliary modem is physically connected via an ex post facto physical connection to a Legacy personal communication device having at least one legacy wireless output channel which has been neutralized or disabled.

Elta's patent document EP2918023A1 describes a partial downlink repeater.

Elta's patent document WO2016199144A1 describes a system for generating, transmitting and receiving auxiliary signals e.g. for use-cases in which portions ("important signal" or "needed signal") of a signal ("original signal") are of particular interest in a given situation, but not adequately received in that situation. The method includes generating an auxiliary signal operative e.g. to bridge between imperfect ability/ies of the transmitters in the situation, and specific needs of the receivers in the situation, and/or to improve reception of the important signal and/or important signal information; and transmitting at least the auxiliary signal to the receiving end such that a representation of characteristics of the important signal, comprising the important signal itself and/or important signal information characterizing the important signal, is replaced enhanced or augmented by the auxiliary signal, at the receiving end.

Co-pending patent document EP2643993A1 describes handover initiation methods.

Synchronization based on triangle inequality, in the context of partial downlink repeater apparatus, is described in Patent document US20150270889.

Co-pending patent document WO2012070049A1 describes routing architectures for dynamic multi-hop backhauling cellular networks.

Co-pending patent EP2684395A4 describes a moving cellular communication operative in an emergency mode.

Application of Zadoff-Chu (ZC) sequences to radio signals, yielding an electromagnetic signal of constant amplitude, is known. Cyclically shifted versions of the sequence imposed on a signal then result in zero correlation with one another at the receiver. Cyclically shifted versions of these sequences are mutually orthogonal if each cyclic shift, when viewed within the time domain of the signal, is greater than the combined propagation delay and multi-path delay-spread of that signal between the transmitter and receiver. The auto correlation of a Zadoff-Chu sequence with a cyclically shifted version of itself is generally zero, although it is non-zero at a single instant corresponding to the cyclic shift. ZC sequences are used in LTE (aka the 3GPP LTE Long Term Evolution air interface) in the Primary Synchronization Signal (PSS), random access preamble (PRACH), uplink control channel (PUCCH), uplink traffic channel (PUSCH) and sounding reference signals (SRS). Cross-correlation of simultaneous eNodeB transmissions (hence inter-cell interference) may be reduced by assigning orthogonal Zadoff-Chu sequences to each LTE eNodeB and multiplying their transmissions by their respective codes which uniquely identify each eNodeB transmission.

An alternative to Zadoff-Chu sequences are Walsh-Hadamard codes aka Hadamard code or Walsh code, used in UMTS. These error correcting codes are based on Hadamard matrices. Typically, although not necessarily, Sylvester's construction of Hadamard matrices is used to yield the Hadamard code's codewords.

LTE user equipment (or alternatively LTE device or LTE mobile device) is any equipment or device used by LTE network users to connect to the network and to get services from the network. The user equipment typically has a communication component used to connect to the LTE network—the LTE modem. This modem may be implemented in various ways, such as but not limited to software installed on a CPU and/or DSP, firmware installed on a FPGA, dedicated ASIC (application specific integrated circuit). Examples for user equipment may include: smartphone, mobile phone, tablet, laptop, cellular dongle (small modem card), etc.

The LTE standard defines how user equipment (e.g. typically the LTE modem part of the user equipment) synchronizes itself to the network. Each base station periodically transmits standard PSS and SSS signals that are used by the user equipment to synchronize itself to the network and extract needed system information that these signals carry. After appropriately receiving the PSS and SSS, the user equipment can synchronize itself to the network and get the information required for upcoming operations in the process of the connection to the network. The LTE standard does not prevent any LTE mobile device (e.g. LTE modem) to synchronize itself to an LTE network. On the contrary, the LTE network invites any LTE user equipment to camp on it (to join the network and get services). This is done by broadcasting the standard PSS and SSS synchronization signals and other vital network's information.

This initial LTE system information (network information of base-station specific information) is broadcasted without any security measures because of the desire to function as an "open" network which allows all LTE modems to synchronize and get basic information about the network so each modem will know if it wishes to connect to that network. For example, this system information contains typically the MIB—Master Information Block and optionally also some of the SIBs—System Information Blocks, which are used e.g. are necessary for user equipment to establish its initial connection to the network. Typically, only by having part of or all this information, conventional user equipment can synchronize and tune itself to the network. The security and authentication mechanisms, which have been defined by the LTE standard, are not operated at this stage. The LTE user equipment can synchronize itself to the network and unveil network Master/System Information Blocks and then, if it wishes, try to continue the process of registration and getting services from the network. However, in private LTE network (aka a network that wants to be detected and give services only to a specific group of LTE user equipment and not to be able to be detected by any other LTE user equipment), this feature that enables every user to synchronize to the network and therefore to detect the network and get access to its system information and try to get services from the network, is not desirable and it may be desired to overcome this. alternatively or in addition, in standard LTE network and more specifically in private LTE networks, this "open" network feature can be also a security vulnerability that may allow DoS (Denial of Service) attacks and therefore again, overcoming this may be desirable.

PSS and SSS are two types of synchronization signals—primary and secondary. Both are detected by all types of UE and are transmitted twice per 10 ms radio frame, or every 5 ms. In LTE, the synch signals are fixed at the central 62 subcarriers of the channel, so the cell search procedure is the same for all types of bandwidths. In LTE, 72 subcarriers (6 RB) are available, but only 62 are used so that UE may perform the cell search using an efficient length of 64 FFT. Primary synch signals are modulated with frequency domain Zadoff-Chu sequence, since Zadoff-Chu may provide lower PAPR than OFDM does. PSS is used for cell identity, whereas SSS is used to identify cell-identity groups. The number and position of subcarriers for SSS, as for the primary synch signal, are the central 62 subcarriers. In cell search, PSS is used first. The UE determines the timing and center frequency by detecting the primary synch signal.

The LTE standard defines how user equipment synchronizes itself to the network. Each base station transmits standard PSS and SSS signals which the user entity, aka user equipment, aka UE, may employ to synchronize itself to the network and to extract the specific system information that these signals may carry which may be used for upcoming stages of connection to the network. The LTE, as a standard, does not prevent any LTE device to synchronize itself to an LTE network. On the contrary, the LTE network invites any LTE user equipment to camp on it, by broadcasting the standard PSS and SSS synchronization signals and vital information required by user entities to camp on the network (the MIB—Master Information Block and SIBs—System Information Blocks, necessary for every user device to establish connection to the network, synchronize and tune itself to the network), without any security constraints. The security and authentication functionalities defined by the 3GPP do not, according to the standard, operate at the above stage. The LTE user equipment may synchronize itself and unveil network System Information Blocks (SIBs), and try to obtain access to it.

The disclosures of all publications and patent documents mentioned in the specification, and of the publications and patent documents cited therein directly or indirectly, are hereby incorporated by reference.

SUMMARY OF CERTAIN EMBODIMENTS

The downlink transmission of the 3G CDMA cellular network, as well as the downlink transmission of the LTE network contains in it control signals of the base station. These control signals provide information to the end user devices (modems, smartphones) how to synchronize themselves to the network, basic parameters like the frequency band and the bandwidth in which the network is operated, resource allocation in frequency and time that the base station allocates to each user, and more. There are control signals that are sent by the user equipment (UE) to inform the network inter alia about quality of the link between the user and the base station and what network's resources are requested. These control signals are designed according to the many use cases in which the CDMA or LTE cellular networks are operated.

However, there are use cases in which there is a need to change some of the control signals but still, to enable to standard CDMA or LTE modems and smartphones to connect to the network and get from it services in a standard way. For example, there are private cellular networks (like enterprise networks), in which there is a need that some of the standard devices that are under the coverage area of the network will be allowed to connect themselves to the network to get services, but there are also under the coverage area of the network some other standard devices that will not be allowed to connect themselves to the network.

It is desired to find a way to distinguish between those standard devices that have permission to attach to the network and the standard devices that are not allowed to be connected to the network.

The process and system herein may be operative to transmit some of the control signals of the CDMA or LTE network not in the standard manner and convert these non-standard control signals to standard signals that carry the necessary information to those standard end-user devices that are allowed to be connected to the network and get services. The conversion may be done by a conversion function. Those standard end-user devices that lack this conversion function will not be able to connect to the specific LTE network. The conversion function may be implemented as an add-on module, or internally inside the end-user modem (or smartphone).

The process by which an end user device can be connected to 3G—CDMA or 4G—LTE cellular networks begins with synchronization. In CDMA as well as LTE, there are specific synchronization signals that are defined by the 3GPP 3G/4G standards. After the end user device synchronizes itself in the time and frequency domains, it can be read master information block (MIB) and system information blocks (SIBs) that the base station broadcasts in order to tune itself to the network. Having this, the network invites every standard end user equipment to connect itself to the network.

This invitation is in some cases, not desired and wanted feature, for example, in case that the cellular network is a private cellular network (airport network etc.). After the end user device synchronized itself to the network, the next stage is that the device asks for network resources so it can start several procedures in order to attach to the network and get services. The network allocates to this end-user device specific frequency resources in specific time durations to start the authentication (and other) processes. At this stage it may happen that many end user devices, which are not allowed to connect themselves to the network, will ask for these resources and overload the network.

According to certain embodiments, some of the control signals are transmitted in a different way, for example, the synchronization channels, or the reference signals, or the broadcast signals are transmitted in a manner other than that determined by the standard, and then to convert to the standard form—standard signals, only to those end user devices allowed to connect themselves to the network. The conversion function may be part of the standard device or an add-on unit that is attached or connected to the standard UE.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

The LTE cellular stack is based on an open standard which is known, and equipment manufacturers develop the protocols accordingly. However, there are cases in which it is desired for an LTE to be closed or private e.g. to prevent entry or flooding of unwanted or unauthorized users on the network. In such cases, the LTE standard's allowing every user to synchronize to the network becomes a liability which may, for example, cause a DoS attack.

Certain embodiments seek:
to allow an LTE to be closed or private, yielding LTE-n, a system for authorized users only; and/or
to prevent the network from being removed from the shelf; and/or
to prevent connection of standard off-grid equipment to the network; and/or
to provide a new, or expanding an existing cellular network to support exclusivity capabilities and create a closed typically unobtrusive system; and/or
to provide an LTE communication network in which some of the control signals of the base station are replaced with non-standard signals;
to provide a private network, taking into account the synchronization methods of the LTE communication network, and/or the detection techniques of the PSS and SSS LTE synchronization signals and/or the LTE system information with which these signals are carried. The P5Sc shown and described herein, which may be a board or module, may have the following functionalities, all or any subset of which may be provided. Any of these may, for example, be implemented in software on a suitably configured processor, or in firmware or hardware:

Detection functionality operative to discern whether or not the base station transmits non-standard control signals. This functionality may invoke itself once each specific interval to check if there is a change and if the base station transmits non-standard PSS/SSS.—Functionality configured for extracting power strength from received signals. In the event that the P5Sc is connected to the standard modem antennas, the P5Sc computes the transmit power according to analysis of the power strength. In the event that the P5Sc is connected to its own antennas, the transmit power is computed via the calibration function.

Calibration functionality wherein the P5Sc extracts the RSRP and RSRI of the standard modem with which the P5Sc is coupled e.g. attached or otherwise associated, and computes the transmit power of the standard PSS and SSS.

Functionality configured for extracting the PCI (Physical Cell ID) and other information from non-standard received synchronization signals.

Functionality configured for computing an appropriate combination of standard PSS/SSS that provide the same PCI e.g. as per the fourth block in FIG. 9b.

Scanning functionality in which the P5S scans for neighboring base stations and according to the information of the neighboring cells that is transmitted by the serving base station and according to the scanning results, a suitable e.g. a best PSS/SSS combination is computed.

According to certain embodiments, an add-on P5Sc module is connected to a standard UE (user equipment)] typically using its external antennas RF ports.

The present invention thus typically includes at least the following embodiments:

Embodiment 1

A method for converting a conventional cellular network into a private cellular network, wherein the conventional network includes nodes equipped with conventional modems operating in accordance with a cellular communication protocol e.g. LTE and storing first orthogonal sequences, the method comprising all or any subset of the following:

Coupling a device (e.g. an external device) to each node in the conventional network, which is desired to belong to the private cellular network, and not to any nodes in the conventional network, which are not desired to belong to the private cellular network;

wherein the device stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, a device associated with a transmitting node desired to belong to the private network, uses a processor to determine which of the first orthogonal sequences is being used, translate the first orthogonal sequence being used using the stored one-to-one correspondence into one of the second orthogonal sequences, and use the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the external device but not to modems not associated with the external device such that only modems associated with the external device can synchronize themselves to the private network and modems not associated with the external device cannot synchronize themselves to the private network.

it is appreciated that the operations above may be governed by logic stored in an external device or the same logic may be stored in the modem itself in which case no external device may be required.

The device may include or be incorporated into any suitable board whose circuitry is designed around any suitable chip programmed to perform logic and functionalities shown and described herein.

The method of embodiments 7, 8 may be implemented by Architectures a and b respectively.

Typically, at least when in a private network supporting mode, the tx modem's add-on looks which of the 3 hard-coded sequences is being used; typically the index is used to generate the sequence. The index u is chosen to take one of (say) the following three values: 25, 29, 34]), translates using the stored one-to-one correspondence, and uses the translated sequence to transmit synchronization signal, thereby to transmit a synchronization signal which uses one of the dozens of orthogonal sequences that are not hard-coded in protocol modems to transmit synchronization signal hence is noticeable and understandable to modems associated with the add-on but not to modems not associated with the add-on.

Typically, a network this is both private and not private—is operative to enable both standard modems and modified (aka with P5Sc) modems as described herein, to receive correctly.

Embodiment 2

A method according to any one of the preceding embodiments and wherein a non-private (aka public) network supporting mode is also provided, in which a modem, when transmitting, uses the hard-coded sequence, not the non-hard-coded sequence in one-to-one correspondence therewith, to transmit synchronization signals.

Embodiment 3

A method according to any one of the preceding embodiments and wherein a combined mode which supports both a private network and a public network is provided, and wherein a modem, when transmitting, uses, in parallel, both a hard-coded sequence, and the non-hard-coded sequence in one-to-one correspondence therewith, to transmit synchronization signals.

Embodiment 4

A method according to any one of the preceding embodiments and wherein the external devices includes PSS and SSS functionality and wherein the device and the standard PSS and SSS have the same networking information.

Embodiment 5

A method according to any one of the preceding embodiments and wherein the external device includes PSS and SSS functionality and wherein the device and the standard PSS and SSS have the same PCI.

Embodiment 6

A method according to any one of the preceding embodiments and wherein the external device is configured for conversion of non-standard over-the-air control signals carrying LTE networking information, to standard signals that carry the same LTE networking information carried in the non-standard control signals and wherein the LTE networking information carried by every specific LTE control signal is typically not changed by the external device.

Embodiment 7

A method according to any one of the preceding embodiments and wherein the functionality is stored in a board/module/add-on housed in a mechanical member added to each modem, where the modem has an antenna and includes a board housing the modem and the antenna, and wherein the mechanical member is external to the board and includes an additional antenna (it is known in the art to ensure that the additional antenna is used rather than the original antenna (on the board).

Embodiment 8

A method according to any one of the preceding embodiments and wherein the functionality is stored in a board/module/add-on housed in a mechanical member added to each modem where the modem has an antenna and includes a board housing the modem and the antenna and wherein the mechanical member is mounted on the board intermediate to the modem and the antenna.

Embodiment 9

A system for converting a conventional cellular network into a private cellular network, wherein the conventional network includes nodes equipped with conventional modems operating in accordance with a cellular communication protocol e.g. LTE and storing first orthogonal sequences, the system comprising:

A device, configured to be in data communication with individual nodes, thereby to enable the device to be in data communication with any individual node in the conventional network, which is desired to belong to the private cellular network, and not to nodes in the conventional network, which are not desired to belong to the private cellular network;

wherein the device includes a processor coupled to computer memory and stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, the processor when in data communication with a transmitting node, determines which of the first orthogonal sequences is being used, translates the first orthogonal sequences being used, using the stored one-to-one correspondence, into one of the second orthogonal sequences, and uses the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the external device but not to modems not associated with the external device such that only modems associated with the external device can synchronize themselves to the private network and modems not associated with the external device cannot synchronize themselves to the private network.

Embodiment 10

A method according to any one of the preceding embodiments and wherein the network information not changed by the external devices comprises a PCI parameter (Physical Cell ID parameter) as set by the network.

Embodiment 11

The method according to any of the preceding embodiments wherein the external device is configured to extract the PCI and then translate the non-standard PSS/SSS to standard PSS/SSS that carry the same PCI.

Embodiment 12

A method according to any one of the preceding embodiments and wherein the external device synchronizes itself through non-standard PSS SSS to a base station in the conventional network, thereby to maintain a capability to transmit standard PSS SSS, to a conventional (e.g. LTE) modem coupled thereto, synchronously e.g. at the time expected by the conventional modem.

Embodiment 13

A method according to any one of the preceding embodiments and wherein the non-standard sequence transmission is from the same family as the standard transmission and therefore the conventional modem sees the non-standard transmission as white noise and wherein a modem (or any LTE user equipment device) associated with the external device e.g. coupled thereto, identifies only the external device's transmission and does not identify that some control signals (e.g. the PSS and SSS), are coming from different sources.

Embodiment 14

A system according to any of the preceding embodiments wherein the device comprises an external device, configured to be coupled to nodes.

Embodiment 15

A computer program product, comprising a non-transitory tangible computer readable medium having computer readable program code embodied therein, said computer readable program code adapted to be executed to implement a method for converting a conventional cellular network into a private cellular network, wherein the conventional network includes nodes equipped with conventional modems operating in accordance with a cellular communication protocol e.g. LTE and storing first orthogonal sequences, the method comprising all or any subset of the following:

Coupling a device (e.g. an external device) to each node in the conventional network, which is desired to belong to the private cellular network, and not to any nodes in the conventional network, which are not desired to belong to the private cellular network;

wherein the device stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, a device associated with a transmitting node desired to belong to the private network, uses a processor to determine which of the first orthogonal sequences is being used, translate the first orthogonal sequence being used using the stored one-to-one correspondence into one of the second orthogonal sequences, and use the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the external device but not to modems not associated with the external device such that only modems associated with the external device can synchronize themselves to the private network and modems not associated with the external device cannot synchronize themselves to the private network.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may whereever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

FIGS. 1a, 1c, 2 illustrate embodiments described herein.

FIG. 5 illustrates a base station transmission received by the modem according to any embodiment of the invention.

FIG. 6 illustrates the internal structure of the P5Sc, according to certain embodiments.

FIGS. 7a-7c, 8a-8b, 9a-9b illustrate embodiments described herein.

FIGS. 10a-10c each show a standard (in FIG. 10a) modem/smartphone with a modem chipset, associated with a P5Sc according to certain embodiments. The smartphone, in FIG. 10b, has a splitter and in FIG. 10c has a pair of external antenna connectors, indicated as circles in the drawing.

FIGS. 11a-11c illustrate embodiments described herein.

Figure 1:
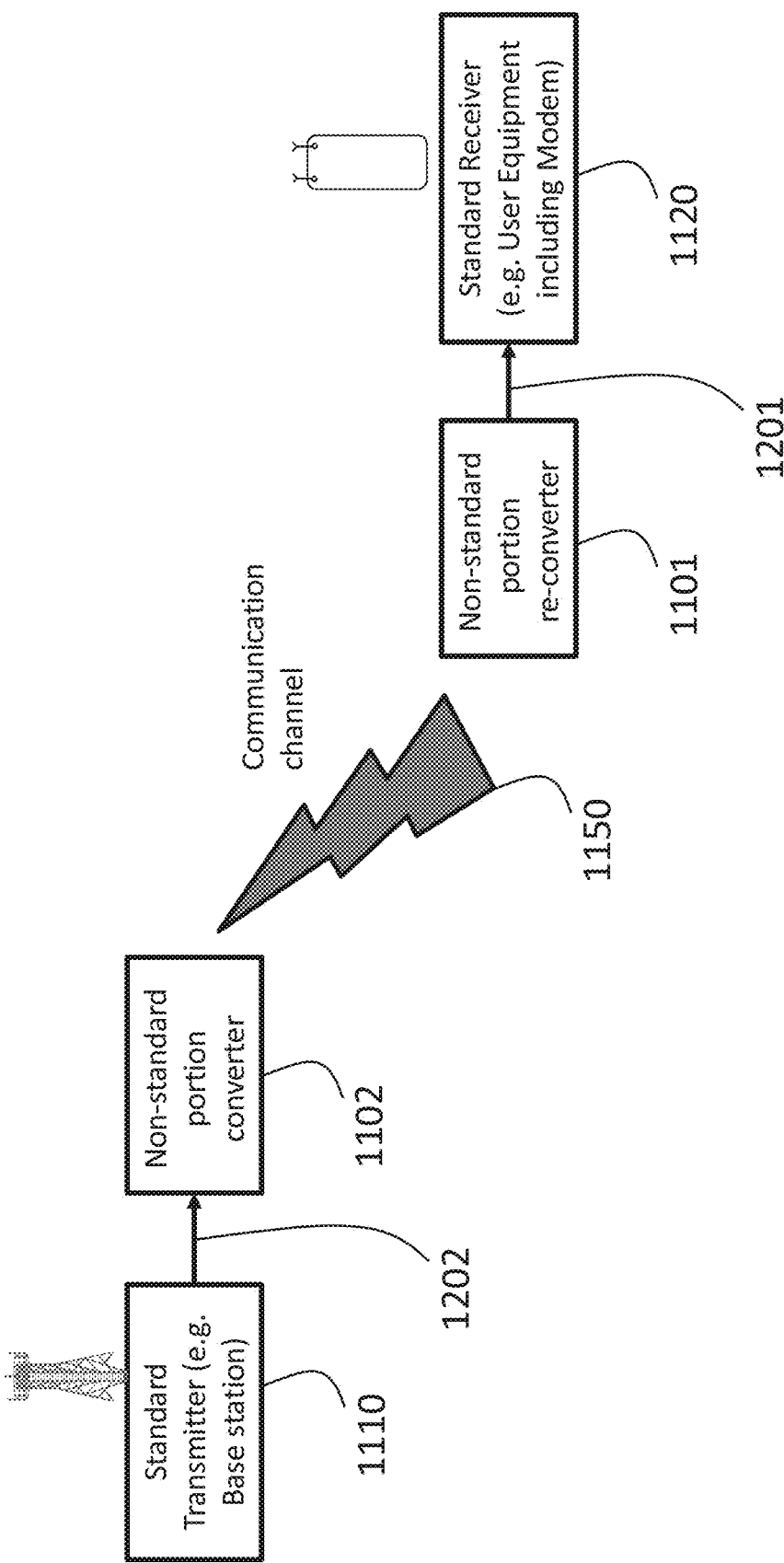
FIG. 1 illustrates a P5Sc device e.g. board or module, to be coupled to a conventional e.g. LTE mobile communication devices.

Also shown is the P5Sc's flow diagram according to certain embodiments.

Also shown are three hardware architectures respectively where Architecture A. is external to the phone's case; Architecture B is onboard, but external to the chip; and Architecture C.is internal—all private network functionality being provided internally, by the modem chip itself which stores logic and data as described herein and is configured to perform functionalities shown and described herein.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (E.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with: methods shown and described herein, or any suitable subset, in any suitable order, of the operations included in such methods, or in accordance with methods known in the art.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

P5Sc as used herein is intended to include or consist of a module or unit or board or add-in which, when associated with e.g. connected to or in data communication with, cellular nodes operating in accordance with a given cellular communication protocol e.g. LTE, allows those nodes but not nodes which are not so connected, to function as part of e.g. synchronize to a network which strives to be private in the sense of selective membership in the network. Thus, P5Sc allows a private network to be achieved because the P5Sc may be associated with a node, if and only if, it is desired to make that node part of the network's membership.

Certain embodiments of the invention include a (typically add on) module, the P5Sc module or unit, that, typically, overrides part of the downlink transmission of an LTE base station and, instead, may transmit different information, which is typically fully synchronized with the original LTE base station transmission so the end user modem does not distinguish that the DL information is coming from two different resources or sources.

A private LTE network is useful e.g. in public safety net use-cases. Typically, the P5Sc supports generation of such networks by allowing only some, "member" nodes, those equipped with the P5Sc module or unit, to synchronize with a network and read its control messages.

The P5Sc may comprise an external unit small enough to be portable and configured to be coupled to a legacy/standard/commercial phone or modem.

The P5Sc unit typically converts non-standard synchronization signals into standard sync signals so that the smartphone or modem, typically unwittingly, receives transmission from two different sources (base station and P5Sc) that typically complement each other.

The P5Sc receiver typically receives the non-standard transmission from a base station, converts the non-standard transmission to a standard synchronization broadcast (typically using a mapping known to all P5Sc transmitter and receiver pairs, so that whatever standard broadcast e.g. sequence a specific non-standard broadcast e.g. sequence is translated to during TX, that standard broadcast will, during RX, be translated back to the same standard broadcast e.g. sequence).

Typically, the mapping comprises a one-to-one pairing between hard-coded sequences in protocol modems and sequences that are not hard-coded in protocol modems.

Thus only the P5S-pinned units (UE's associated with the P5Sc) can synchronize to the system e.g. private network, and extract the information needed to connect to the private network, for example in the case of a P5S module, which converts non-standard synchronization signals of LTE base station to the appropriate 3GPP standard PSS and SSS synchronization signals. A standard LTE modem that receives the PSS/SSS standard signals, which are transmitted by the P5S, can extract all the information that is carried by the PSS/SSS signals, such as for example the original physical—layer cell ID group (PCI).

The non-standard PSS/SSS (or some other proprietary control signals e.g. as described herein) are typically transmitted by a LTE base station that may transmit standard or non-standard PSS/SSS signals. This feature of the base station is necessary for a private LTE network. It is typically a standard LTE base station that in some cases transmits all the downlink control messages, as defined by the 3GPP, except several control messages that only the P5S can read.

The P5S add-on (board or) module is a convertor, which converts non-standard control signals of such an LTE base station, to standard LTE signals and enables standard LTE user equipment devices to be connected to base station that transmit partially non-standard LTE control signals.

From standard LTE modem point of view, the P5Sc add-on module typically gets the whole LTE downlink transmission from two resources which may be considered as two different base stations: the P5S "base station" that actually transmits partial downlink control signals, for example PSS and SSS only, and . . . . These signals override the non-standard PSS and SSS that cannot be detected by this standard modem. The transmission of the P5S and the transmission of the modified base station complement each other. Given this, only standard modems that contain the functionalities of the P5Sc or a standard LTE modem to which the P5S unit is coupled, can be synchronized and can be connected to this specific private LTE network.

The above-described technology is advantageous inter alia because it strengthens the synchronization capabilities of standard LTE base stations against interferences and/or prevents unauthorized standard LTE user equipment from synchronizing themselves to such base stations, which are part of an LTE private network. Having this, the network frequency band is not occupied by roamers or modems that do not belong to the network and try to hook onto the network. This prevention feature of importance, for example, in a public safety LTE network that operates in hazardous areas and wants to retain a frequency band clean from standard phones that try to connect to the network. Embodiments of the invention may be implemented inside the LTE modem or as a typically small, typically low power add-on device coupled to a standard LTE UE modem or smartphone. The receiver of the P5S unit knows how to synchronize and extract the Physical-layer Cell ID group (PCI) from the proprietary transmission and then convert this PCI to the appropriate standard synchronization channels of the LTE and to the appropriate PCI.

A cellular network may for example comprise a fixed cellular network or a "moving" cellular network which includes at least one relay with both base station and mobile station functionality, as described e.g. in Elta patent document U.S. Pat. No. 9,769,871 to Giloh, the disclosure of which is hereby incorporated by reference, and in many other cellular networks by Elta.

The architecture of conventional cellular networks is suitable for cellular operators whose defining characteristics include eagerness for new user entities to join "their" network, e.g. by roaming. In conventional networks, any user entity can easily detect and decide to join any base station in any cellular network, and protocols are standard, uniform and open. This may be termed a "public" network. It is appreciated that inter alia, FCC's 911 rules require wireless service providers or cellular operators to transmit all 911 calls to a PSAP or Public Safety Answering Points, even if the caller does not subscribe to the operator's service.

Unfortunately however, conventional networks are entirely unsuitable for those cellular operators to whom it may occur to have an opposite policy e.g. to prevent any new user entities, or certain potential user entities, always, or from time to time, from joining "their" networks, and/or from even discerning that their networks exist. For example, at certain times, the operator may find it difficult to provide cellular services to his own existing user entities (e.g. in a certain region inhabited permanently or temporarily with a large number of user entities), hence may want to prevent new user entities from availing themselves of the network. A network which sometimes or always prevents user entities from joining it, may be termed a private network. Such a network may, for example, e.g. as described herein, transmit a manipulated or modified synchronization signal (instead of, or in addition to, e.g. parallel or simultaneously with a conventional synchronization signal understandable to all user entities). The modified synchronization signal is understandable only to "member" user entities which may be manipulated or modified to understand the manipulated signal, which is not understood by user entities not so modified.

According to certain embodiments it is desired to implement such a policy without replacing the modem chips in the existing fleet of user entities since modifying LTE chipsets or other modem chips by Qualcomm, Sony, Altair Semiconductor, or other modem chip manufacturers is a complex process whose cost may begin at tens of millions of dollars Certain embodiments seek to provide a cellular network which supports cellular operators without assuming that the operators always automatically want all new user entities to join their network.

The LTE protocol, which is of course open, defines specific positions for both Primary and Secondary Synchronization Signals, which are known. Therefore, any user entity knows where in the time domain to find these signals, if and when sent. These signals then inform the user entity of the frequency and point in time t at which the typically 10 millisec long frame begins, allowing that user entity to "lock into" the network's synchronization.

LTE synchronization is described in the following reference: http://lte-bullets.com/LTE%20in%20Bullets %20-%20Synchronisation%20Signals.pdf http://www.teletopix.org/4g-lte/how-synchronization-channel-works-in-lte/ the disclosure of which is hereby incorporated by reference.

In LTE, sets (also termed herein "families") of dozens of orthogonal sequences of bits (which, being orthogonal, may be broadcast simultaneously without substantial mutual interference) are known, each having a (prime) sequence number and kernel from which each sequence may be generated. In conventional standards and protocols such as CDMA, only a few of these sequences (e.g. 3 sequences) are actually hardcoded into device modems for broadcasting by the device's base station. Dozens of sequences, known to be orthogonal, remain, which are not in the standard and are not hardcoded into devices for broadcasting by the device's base station. According to an embodiment, each hardcoded sequence number is paired (one-to-one-correspondence) to a new number corresponding to one of the dozens of sequences that is not hardcoded. Each receiver in a board/module/add-on understands what is the series e.g. by receiving this information from the base station or because the one-to-one pairings between sequences is pre-stored in the board/module/add-on receiver. Thus, due to the one-to-one pairings, the "coloring map" is maintained.

The base station transmits the sequence which corresponds to the paired non-hardcoded number, synchronously, e.g. by waiting, and transmitting in the next frame n+1 rather than in a current frame n, and in the proper slot.

The base station typically transmits the sequence which corresponds to the paired non-hardcoded number, synchronously by waiting, and transmitting in the next frame n+1 rather than in a current frame n, in the proper slot. It can be seen in FIG. 2-A that the synchronization channels are transmitted in slot 0 of sub-frame 0 and slot 0 of sub-frame 5 (according to the standard, prior art). The P5S may synchronize itself at frame N and then transmits the standard signals at frame ≥N+1. It is appreciated that "slot" is a standard lte term referring to part of the lte frame.

It is appreciated that a one frame (typically only 10 millisec) delay does not cause any noticeable ill-effect. the PSS and SSS are typically the same in every frame so a one frame delay is negligible.

Typically, the base station transmits over the air ZC synchronization sequence for the PSS. This sequence comprises 62 vectors. In addition there is the M-Sequence signal for the SSS. The PSS and SSS sequences belong to a family of sequences characterized in that that the cross-correlation between them is zero but the auto correlation is very accurate, in the time and frequency domains. The 3GPP standard decides about some specific sequences of these families (The ZC and M sequence families). If the base station for example transmits different sequence of this family (which does not the standard sequence) then no standard LTE modem can synchronize itself to the base station. Only the P5S that search for this signal can do this.

Figure 3:
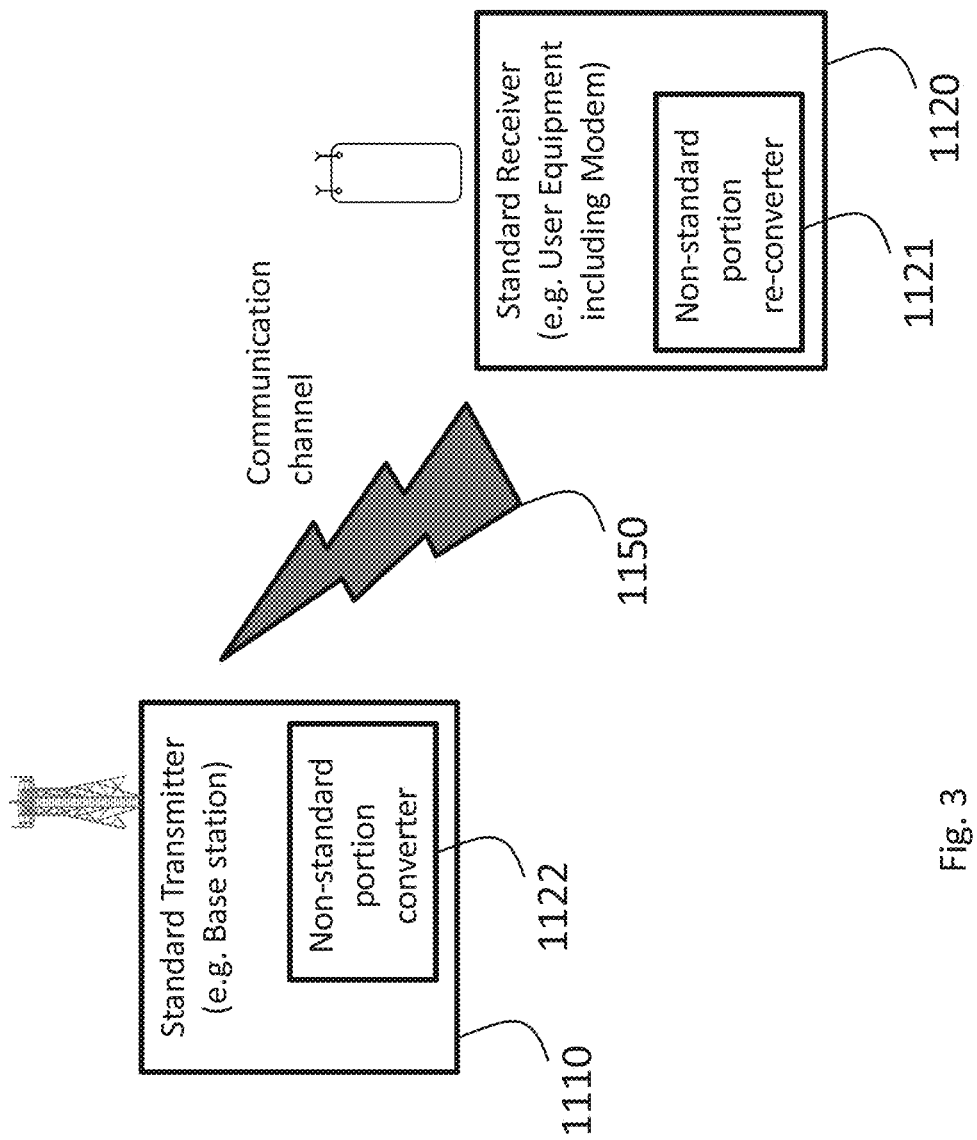
FIG. 3 illustrates a base station transmission according to any embodiment of the invention.
Figure 4:
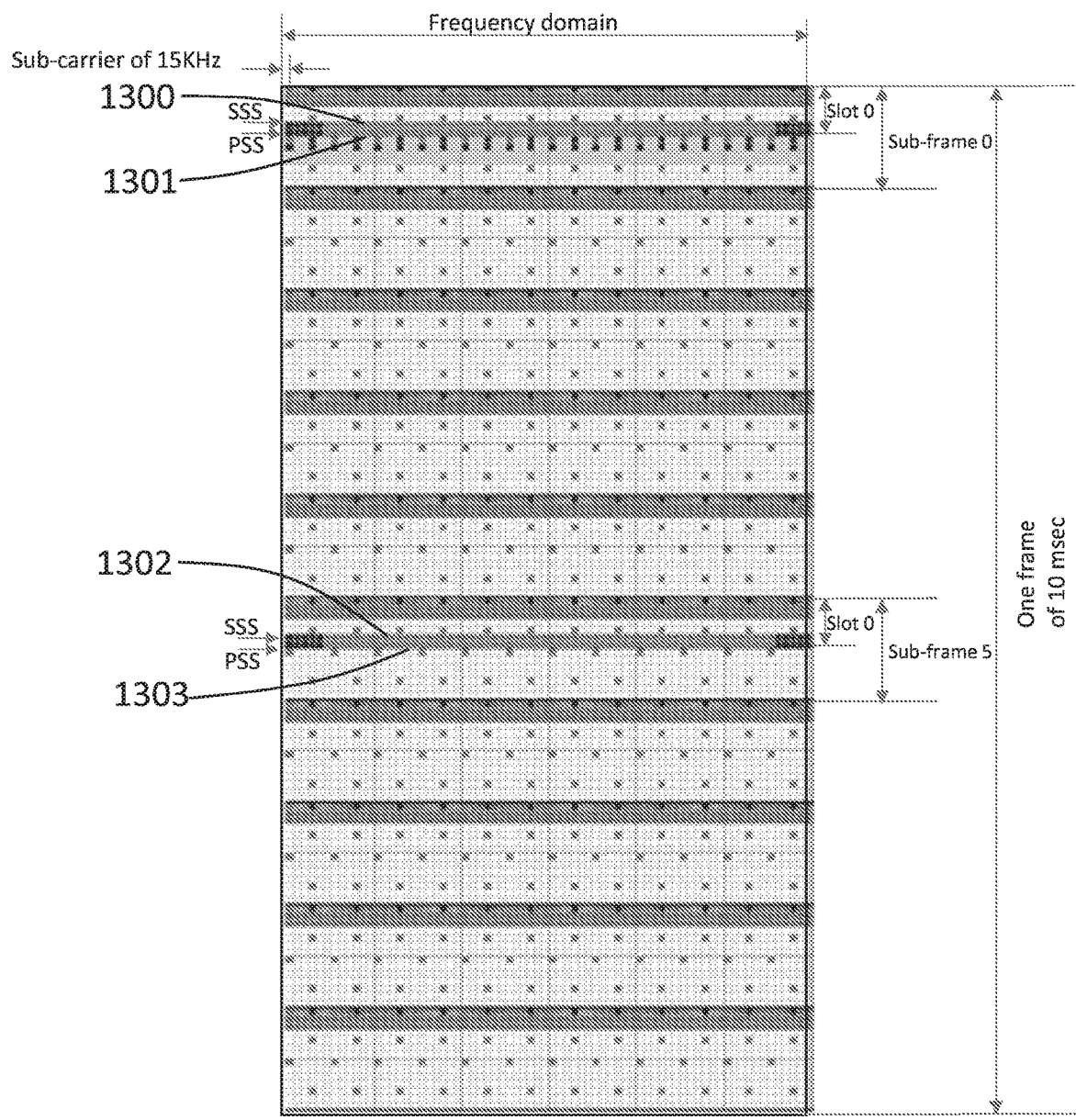
FIG. 4 illustrates a P5Sc transmission according to any embodiment of the invention.

For example, FIGS. 3-5 show that the synchronization channels are transmitted in slot 0 of sub-frame 0 and slot 0 of sub-frame 5 (according to the standard, prior art). So, the P5S may synchronize itself during a frame N and then transmit the standard signals in the next frame, frame N+1

It is appreciated that waiting order of magnitude one frame (typically only 10 millisec) engenders such a small delay that no noticeable ill-effect results.

The base station transmits, over the air, a ZC synchronization sequence for the PSS. This sequence comprises 62 vectors. In addition there is the M-Sequence signal for the SSS. The PSS and SSS sequences belong to a family of sequences characterized in that the cross-correlation between sequences which are members of this family, is zero but the auto correlation is very accurate. This is in the time and frequency domains. The 3GPP standard adopts certain specific sequences within the ZC and M sequence families (aka standard sequences). So, if a base station for example transmits a sequence within the ZC or M family other than the standard sequences, no standard LTE modem can synchronize itself to the base station. In contrast, the P5S or external device shown and described herein is configured to search for this signal hence may synchronize itself responsive to the transmission (by the base station e.g.) of the non-standard sequence which the P5S is configured to search for.

The synchronization signals in LTE, which are control signals, are thereby manipulated in a manner which preserves their orthogonality vis a vis the original synchronization signals.

CDMA sequences are also characterized by orthogonality but may be less adequate for the synchronization task because when two CDMA signals of the same sequence correlate to each other, they are wider and less nailed in the frequency and time domain, than is a ZC sequence.

According to certain embodiments, some, typically less than all, of the LTE control signals are changed e.g. to provide a private network as described herein but alternatively for other reason/s, without losing the control signals' networking features, and typically retaining other control signals without change.

For example the synchronization signals may be "changed" in the sense of choosing different sequences as described herein, which sequences are however from the same families, the problem to be solved being to prevent a standard LTE modem (that does not belong to a network seeking to be private) from to synchronizing itself to the network while at the same time allowing LTE modems that do belong to the network, to synchronize themselves to the network, even though the private network modems/smartphones are all off-the-shelf commercial end-user equipment. Typically, this is done by providing a P5S convertor (where P5S typically includes PSS and SSS. The P5S has a functionality of conversion of non-standard over the air control signals carrying LTE networking information, to standard signals that carry the same LTE networking information carried in the non-standard control signals. The LTE information carried by every specific LTE control signal is typically not changed. The signals are transmitted, typically, in a non-standard way as described herein (which differs from the LTE standard, for example), but the LTE content is retained. For example, the base station transmits, over the non-standard synchronization signals, the PCI parameter (Physical Cell ID parameter) as set by the network—without change. The P5S "understands", aka is familiar, with the non-standard transmission, in the sense that the P5S is configured to extract the PCI and then "translate" or convert the non-standard PSS/SSS to standard PSS/SSS that carry the same PCI.

Because the P5S synchronized itself (through the non-standard PSS SSS) to the base station, the P5S typically has the capability to transmit the standard PSS SSS, to the coupled standard LTE modem, at the appropriate and adequate time e.g. as depicted in FIG. 4. The standard and non-standard PSS and SSS are selected to have the same networking information (e.g. the same PCI).

The non-standard transmission of the base station does not interfere with the transmission of the P5S and, conversely, the transmission of the P5S does not interfere with the non-standard transmission of the base station.

The orthogonality features of the control signals are used in certain embodiments as follows: the non-standard sequence transmission is from the same family as the standard transmission and therefore the standard modem sees the non-standard transmission as white noise (like CDMA), e.g. as shown in FIG. 5. The standard modem (or any LTE user equipment device) identifies only the P5S transmission. and does not identify that some of the control signals, like the PSS and the SSS, are coming from different resources or sources.

Turning now to the illustrated embodiments, which are merely exemplary of many other possible embodiments:

The P5S module may detect, in a first stage, if a specific base station transmits standard control signals—standard PSS/SSS, or non-standard PSS/SSS. In the event that the base station transmits standard PSS/SSS, it does nothing and only checks periodically if the base station is still operating in a fully standard way. In such a case, a standard modem may synchronize itself to the base station and extract all the necessary information, without the involvement of the P5S.

In the event that the base station transmits non-standard PSS/SSS, and perhaps additional/alternative other non-standard control signals, only the P5S module can detect such signals (non-standard signals). the base station typically transmits the non-standard signals exactly at the specific time that has been defined by the LTE standard for the corresponding standard signals, and these non-standard signals carry the same information that the standard control signals carry. For example, the non-standard PSS/SSS does typically carry the physical cell ID code (PCI).

The P5S typically scans and finds these (non-standard) synchronization signals, synchronized itself to the base station that transmit them and then finds the PCI of the base station. In accordance with this PCI, the P5S typically chooses the correct configuration of standard PSS and SSS, a configuration that provides the original PCI (e.g. that which was transmitted by the base station). The P5S transmits these two standard original synchronization signals (e.g. those extracted from the non-standard signals) in parallel (e.g. in the same time and frequency region) to the transmission of the non-standard PSS/SSS signals of the original base station, at the appropriate time-slots/period, as it is depicted in FIG. 1. The parallel transmission of the standard signal is typically in addition to the non-standard signals, however there may be cases in which the parallel transmission is instead the non-standard signals (e.g. by removing the non-standard signals and replacing them with the standard signals). Having this (the parallel transmission of the standard signals) the modem receives a complete and standard DL transmission.

As shown in FIG. 2 the transmission of the P5S [102] (which transmits only the relevant standard signals in the appropriate time/frequency region, e.g. in our example the PSS and SSS), the transmission of the modified base station [111] which includes a standard frame but with a region that has non-standard/modified signals [112] and [113]. These signals are shown as white boxes as a representation of the low correlation of the non-standard PSS and SSS with the original standard PSS and SSS in our example of control/synchronization signals, and what has been received by the receiver of the standard modem [120]. The complete downlink (DL) map that is received by the standard modem [120] is typically a combination of both P5S and the modified base station.

Each one of these transmissions, the P5Sc transmission and the base station transmission at the location of the modem, complement each other. It may be, for example, that the non-standard PSS and SSS that are transmitted finally by the base station are built from different roots of Zadoff-Chu sequence (for the PSS) and different M-sequence for the SSS relative to the non-standard PS. Therefore, because of the very good cross-correlation of these sequences, the standard modem will see only the cross-correlation "noise" from these non-standard sequences; see [112] and [113] in FIG. 6. This cross-correlation "noise" does not interfere with the close transmission of the P5Sc; the P5Sc transmission is typically internal and therefore can be easily strong relative to the received transmission from the base station.

The timing of both transmissions is depicted in—FIG. 7a, b, c. FIG. 1 shows complete transmission of the modified base station (e.g. at the input of [1101], [1120] and [1120] e.g. in FIGS. 1, and/or 1a and/or 1c and/or 12 respectively). the proprietary (aka non-standard) PSS and SSS [210], [211], [212] and [213] are transmitted at the correct time period/region but are not the standard signals. FIG. 7 (say) depicts timing transmission of the P5Sc (e.g. at the output of standard portion generator [1101b] e.g. in FIG. 1c) and FIG. 5 or 7c (say) depicts what the receiver of the modem may extract from the transmission of the modified base station (e.g. at the input [1201] to the Standard receiver [1120] e.g. in FIGS. 10 and/or 10c). internal structure and components of the P5S may be e.g. as depicted in FIGS. 6 and/or 8b and/or in FIG. 10b and/or in FIG. 10c. an example main flow diagram operative in conjunction with any of the embodiments shown herein is depicted e.g. in FIG. 9b.

Typically the P5Sc transmits the standard PSS/SSS (e.g. at the output of standard portion generator [1101b] in FIG. 1c) at the same power that the non-standard PSS/SSS had been received, e.g. so the standard modem that receives these signals will have the same power level that is measured by itself directly from the received reference signals (RSs) of the base station, to enable it to be interpreted as it was transmitted by the base-station.

FIG. 4 depicts the timing transmission of the P5S and FIG. 5 depicts what the receiver of the modem may extract from the transmission of the modified base station.

The internal structure of the P5S, according to certain embodiments, is depicted in FIG. 6; the logic for all of any subset of the functionalities described herein may be implemented by the main CPU. The P5S's flow diagram according to certain embodiments, is depicted in FIG. 7. It is appreciated that any subset of the components in FIG. 6 or operations in FIG. 7 may be provided, rather than providing all illustrated components and operations.

The P5S transmits the standard PSS/SSS at the same power that the non-standard PSS/SSS have been received, so that the standard modem that receives these signals will have the same level of power measured by itself directly from the received reference signals (RSs) of the base station.

The P5S unit may be connected directly via splitters to the original antennas of the standard modem/smartphone or may use its own antennas, e.g. as depicted in FIGS. 8a-c. In the event that the P5S has its own antennas, the P5S may use a calibration process based on the RSRP/RSSI measurements of the standard modem associated with the P5S.

Due to the fact that the PSS/SSS are transmitted continuously in specific intervals at sub-frame 0 and sub-frame 5 of each frame, the computation delay of the P5S does not impact the timing. The P5S that is synchronized to the base station via the non-standard signaling transmits the SSS and PSS as computed and the exact time they are to be in the downlink waveform.

A network may have just one, private network mode. Or, a network may have several modes: public, private, both (combined)—which are manually or automatically selectable.

In combined mode, the network may function as a standard network whose base stations transmit standard LTE synchronization or other control signals, or the network may function as a private network in which its base station transmit modified/different synchronization or control signals.

The P5S has the capability to identify, by itself, if the base station transmits modified or standard control signals. The process may be that the P5S matches/correlates the received synchronization signal (or other control signal) with the standard sequences. If the received synchronization signal is standard, the P5S does nothing. If the P5S does not match/correlate the standard signal/sequence, the P5S correlates to the non-standard sequences. After the correlation process, the P5S continues to be synchronized with the base station, and, in parallel, extracts the information from these control signals, converts this information to the appropriate standard signals and transmits these signals. In the case of synchronization signals, the P5S may extract the PCI (Physical Cell ID) and transmit this parameter in a PSS/SSS combination that fits this PCI.

This operation is related to all the base stations of its network which are identifies by the PLMN (Public Land Mobile Network Code) prior art Typically in combined mode both the standard portion and the converted portion are transmitted together. In that mode regular modems (without P5S) and modified modems (with P5S) can both receive the transmission correctly. The mode selector may select to transmit at the relevant portion the standard signal or the non-standard signal or both (e.g. addition of these two].

A network may automatically select which of the above modes to activate—for example if the network detects a potential situation of interference or situation that only the dedicated modems needs to detect the base station then the non-standard signal transmission mode may be activated To transit between the modes the mode selector typically changes the signal it takes.

It is appreciated that the above may be implemented by any of the 3 hardware embodiments presented in FIGS. 9a-9b.

Any suitable method may be employed to revert from private mode back to public mode. For example, the P5S may periodically (e.g. every frame) correlate the modified control signals to the modified sequences. In the event that there is no correlation, the P5S correlates the modified control signals to the standard sequences. In the event that there is a match with the standard sequence the P5S reverts to the normal/standard/non-private mode and stops transmitting its signals.

Hardware architectures are shown in FIGS. 9a, 9b, respectively.

Architecture A. is external to the phone's case. An external device may be added to any cased phone (or laptop modem dongle) that supplies a port that supports connection of the internal modem via connector/s and the port, to an external antenna. The external device will include an external antenna coupled to a board/module/add-on which is connected via the provided port to the cased phone's modem, just as a conventional external antennae would be Architecture B is onboard, external to the chip:

For future phones (or tablet, laptop) which support this, a board/module/add-on may be added on the phone's main board, between the phone's antenna and modem.

There is no smartphone known at this time, that supports an onboard circuit board, but there are modems to which such a board may be added. Such a configuration is depicted in FIG. 8A.

The connection to a smartphone may be as shown in FIG. 8c. Many smartphones have U.FL (or other) connectors for external connection to antennae. In such a case, if the external antenna is connected, the internal antennas are automatically disconnected.

In the event that the P5S contains separate antennas, a calibration function may be implemented. The P5S may then extract the measured RSSI RSRP of the standard modem/smartphone and suitably obtain this information via AT Commands or Smartphone application. Depending on whether the RSSI RSRP measurement power is high or low, the calibration function will then decrease or increase the transmission power of the P5S.

Typically for both architectures a, b:

The board/module/add-on typically includes connectors to the antenna and to the modem. The connectors (and typically associated adaptors) match the hardware of the phone's antenna and modem e.g. may be RC connectors/RF connectors/USL connectors/TNC/SMA/n-type; female if the antenna/modem connector is male, and vice versa, etc.

It is appreciated that a board/module/add-on, typically the same board/module/add-on, is added (installed retroactively e.g. externally or between transceiver and antenna) to each base station and to each user entity. For the latter possibility, installation for each base station and for each user entity may be as simple as disconnecting the transceiver from the antenna, then hooking up the board/module/add-on's connectors to the transceiver on the one hand, and to the antenna on the other hand. It is appreciated that the base station and mobile station each continue operating normally and are unaware of the existence of the board/module/add-on. According to one embodiment, the board/module/add-on is always active on the RX side, and the TX side is activated only when the device is in private network mode.

Architecture C.is internal—all private network functionality herein is provided internally, by the modem chip itself.

It is possible to use ELTA'S TAC4G_e.g. as described in the following http world wide web aspx reference:

iai.co.il/2013/36570-45720-en/ELTA%20-%20Systems%20by%20Product%20Lines e.g. in conjunction with samsung off the shelf components, typically as separate boards with an interface between them e.g. Rf ports.

elta's tac4 may be provided as a software upload to the chip of its modem.

The illustrated embodiments are now specifically described, it being appreciated that the illustrated embodiments are merely exemplary of the teachings herein:

FIG. 1 is a simplified pictorial diagram of units/functions of the P5Sc solution. 1110 is a standard base station that additional non-standard functionality, the 1102 portion, is added to it. This non-standard portion converter contains the conversion functionality that converts standard portion of the standard signal to non-standard portion. Example of signal portion can be for example each one of the control signals of the downlink transmission to non-standard control signals. In this configuration the non-standard portion converter is connected to the standard base station in serial. It means that the 1202 interface can be implemented for example by RF cables that connect between the antenna ports of the base station (1110) and the non-standard portion convertor (1102) receive RF port. Alternatively interface 1202 can be implemented in the RF Intermediate interface (I/F) or in the Base-band interface of the base station in the transmit chain. The non-standard portion convertor transmits the modified downlink transmission via a communication radio link (1150) to standard UE (1120) equipped with the Non-standard portion re-converter (1101). The UE (1120) can be for example standard modem or smartphone. The non-standard portion re-converter (1101) receives the downlink transmission, synchronized to it, extracts the non-standard portion, as well as the estandard signals, converts the non-standard signals to the appropriate standard signals and transfer/transmits the final standard original signal to the receiver of the standard UE (1120). Having this, the standard receiver of the UE (1120) gets a complete standard downlink signal. The interface between the Non-standard portion re-converter and the UE (1201) can be RF cable to the UE antennas or a transmission via the antennas of the Non-standard portion re-convertor (or alternatively in IF interface or in base-band interface as described above for the transmitter chain interface to the non-standard portion converter.

FIG. 1a describes internal blocks/functions of the Non-standard portion converter (1102 in FIG. 1). The convertible portion detector (1102a) is a receiver that synchronizes itself to the standard base station transmission (1110), extracts the necessary control information from this transmission and transfers the results to controller (1102f). The necessary information of what to extract is defined by control messages from the controller (1102f). The controller responsible to the operation of the whole Non-standard portion converter. It takes decision of what control signals have to be changed, what type of changes have to be done and the way the modified downlink transmission will be: If the output transmission will be without any change and the original transmission of base station (1110) will be transferred without changes, or some standard control signals will be replaced by modified non-standard control signals, or the whole standard downlink transmission of base station (1110) will be transfer in parallel with the modified control signals that are created by 1102b and 1102c of the Non-standard portion convertor. The definition to the controller of what mode of operation will be performed will be done by in-advance configuration or manually by operator or by detection algorithm. Nonstandard control signals are generated by the Non-standard portion generator (1102b) according to the commands from the controller. Combiner 1102c combines the appropriate configuration/mode of operation, according to the controller commands. Selector 1102d selects the port to be transfer to the antenna 1102e. The selector is controlled by the controller.

Figure 1C:
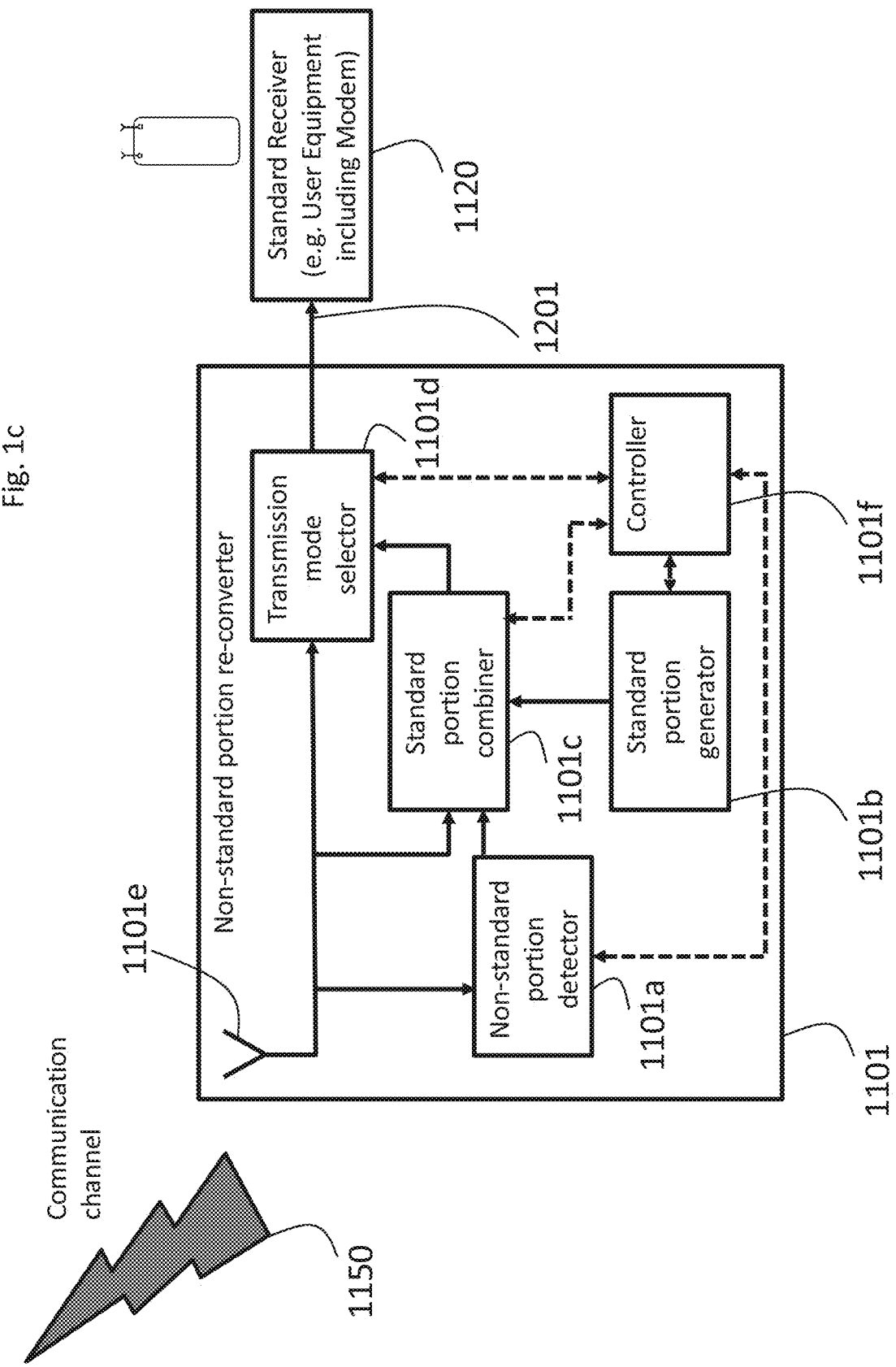

FIG. 1c describes functionality of the Non-standard re-convertor. It detects (1101a) if the transmission is standard or non-standard and what is the mode of operation of the non-standard portion convertor (1102 of FIG. 1) sends the result to the controller (1101f). In case that the transmission is standard, the controller commands the transmission mode selector (1101d) to transfer the received signals directly to the UE receiver (1120e) without doing almost anything. In case that the Non-standard detector (1101a) detects that the received signals are non-standard, it sends its output to the controller, which commands the standard portion generator unit (1101b) to generate the appropriate standard signals and send this signals to the combiner (1101c) that combines the received standard signals with the standard signals that comes from the standard generator (1101b), all this according to the mode of operation, and output them to the UE (1120). The combiner (1101c) can create several combinations: combination of control signals from both resources, or only the new standard signals or any other combination.

FIG. 2 and FIG. 3 depict different connections between the standard base station and the Non-standard portion convertor and between standard UE and the Non-standard portion re-converter in addition to serial connection (1202) that is described in FIG. 1. In FIG. 2 the Non-standard portion convertor (1112) can be connected for example between the base-band unit and the RF unit of the standard base station (1110). The connection is done via 1203 interface. In the UE side the Non-Standard portion re-converter (1111) can be connected for example between the RF section and the baseband chipset of a standard UE modem (1120)

FIG. 3 depicts a connection in which the Non-standard portion converter functionality (1122) is integrated inside the software of standard base station (1110) and the Non-standard portion re-converter (1121) is integrated inside the software of a standard UE device (1120)

FIG. 4 depicts a complete downlink transmission of an LTE base station, as it has been defined by the 3GPP. We would like to modify in this example the synchronization control channels, the PSS (1301), (1303) and the SSS (1300),(1302). This modification is done by the non-standard portion convertor that is connected to the base station as it is described before.

FIG. 5 depicts the UE side. The Non-standard portion re-converter is a small device, the P5Sc (101) that receives the non-standard transmission, synchronize itself to the non-standard PSS/SSS, extract the information that is carried by these signals—the Physical Cell ID (PCI), choose the appropriate combination of standard PSS/SSS and transmit them at the appropriate time and in the same power to the standard UE modem (120). In this figure it can be seen that the standard modem receives the complete downlink transmission from two resources: A standard base station (that contains/connected to Non-standard portion re-converter) and the P5Sc.

FIG. 6 depicts what is transmitted by the P5Sc (FIG. 6 C) and what is transmitted by the original base station (FIG. 6 B), as it is received by a standard UE. It can be seen that the P5Sc transmits a new standard combination of PSS and SSS at the appropriate time, exactly at slot-0 of sub-frame-0 (103), and slot-0 of sub-frame 5 (104). The transmission of the base station contains the non-standard PSS and SSS (112) and (113), as it is modified by the Non-standard portion convertor of the base station.

FIG. 7-C depicts the base station transmission as it is received by standard UE. It can be seen that the non-standard PSS and SSS are received as white noise because the orthogonality feature of the PSS and SSS sequences.

FIG. 7-B depicts the P5Sc transmission

FIG. 7-C depicts the combination transmission of both the P5Sc (210-213) and the base station FIG. 8 depicts the internal units of the P5Sc The Non-standard portion converter can be added also in the opposite direction in a cellular network, i.e. the converter can be added to the User equipment in the transmit chain and the re-converter to the base station in the receive chain (aka in the uplink direction).

FIG. 8-A depicts units in the P5Sc. The receiver (1310) synchronizes itself to the non-standard synchronization signal, extracts other non-standard signals and transfers the results to a main controller (1314) and the synchronization result to the internal clock function (1311). The controller (1314) calculates according to the information that is carried by the non-standard control signals the appropriate standard control signals and commands transmitter (1312) what are the standard control signals to be transmitted. The transmitter should transmit and the exact time according to the internal clock synchronization pulse.

FIG. 8-B describes the actual implementation of the P5Sc. The P5Sc has a baseband unit (1320) that contains in it the digital parts of the receiver and the transmitter, the internal clock mechanism that synchronizes the operation between the transmitter and the receiver and a main controller of the P5Sc.

FIG. 9-A depicts process and functionalities of the Non-standard portion convertor and the Non-standard portion re-convertor. It is a general process for any non-standard control signals FIG. 9-B depicts a process of the specific case of non-standard PSS and SSS synchronization signals that carry the PCI information.

FIG. 10-A depicts the way that the Non-standard portion re-converter P5Sc unit (1401) is connected with a standard UE device (1400). In this case, the P5Sc is a separate unit that has its own antennas and transmits the appropriate control signals via its antenna. In this configuration, the transmission of the converted control signals should be at the same power level of the control signals that are received in the standard modem. In addition to this, because the signal is transmitted via separate antennas, the P5Sc antennas, the P5Sc should include a calibration capability in order that the same power level will be transmitted by the P5Sc. It can be that this calibration function gets the RSSI and RSRP measurements of the standard UE via the USB interface or via the air (from the UE or the base station)

FIG. 10-B depicts a connection in which the P5Sc is connected to the internal antennas of a standard UE device via a splitter (1402) or some other radio unit.

FIG. 10-C depicts a connection which is more common, in which the P5Sc is connected to a standard modem or smartphone via external antenna connectors (1404) which exist in most of the UE devices. In this case the UE device makes use of the external antennas of the P5Sc via external splitters (1403)

FIGS. 11*a*-11*c* illustrated 3 implementations. FIG. 11-A depicts a separate unit (1410) to the UE device (1411). FIG. 11-B depicts an internal module (1412) installed inside the UE device case and FIG. 11-C depicts a SW solution in which the Non-standard portion re-converter functionality (1413) is part of the chip set.

Generally it is appreciated that physically and/or logically, the add-on between antenna and phone, implementing embodiments described herein, may be algorithms as described herein, in conjunction with: an electric board with chips, or only a chip onboard the modem electric card or software inside the processor (e.g. chip, ASIC, DSP, CPU) of the modem. According to one embodiment, the add-on is always active on the rx side, and on the tx side is activated only when the device is in private network mode. Alternatively both the RX side and TX sides are always activated, which is typically less complex although more power may be consumed.

Elta's tac4 may be used as base station having the modem described herein, and the private network functionality may be provided as a software upload to the chip of the modem described herein. If, on the base station side the base station and its source code is owned by the developer, the non-standard converter (e.g. As in FIG. 12) can be incorporated as a software upgrade to a standard base station. If on the modem side the source code of the modem chip is not owned by the developer who consequently cannot incorporate the non-standard re-converter as software external hardware (e.g. chip or electric card as described herein) may be used to enable the re-conversion functionality.

It is appreciated that the term private vs. non-private or public as used herein is intended to include a network which is vs. is not selective about who its nodes are to be e.g. at least one nodes e.g. smartphones are not desired to be nodes, in a private network, whereas a non-private network may accept all nodes who wish to join the network. So, the term "public" as used in this sense is not to be confused with the term "public" in other contexts such as PSTN, public key in cryptography, Public Safety Answering Points, and so forth. A public network may also be termed an "open" network.

Technological advantages include all or any subset of providing an add-on solution for commercial end units which allows a legacy deployment of end-units to continue operation and benefit from the embodiments shown and described herein, rather than having to be recalled. One solution may be used for end units provided by plural rack equipment manufacturers.

The solution is cost-effective and modular in relation to alternative solutions which might be based on changes in the end unit modem that require high costs and collaboration created by the end unit, and eventually adhering to a specific product e.g. a specific rack equipment manufacture's end unit.

Applicability is intended to include but not be limited to any of the following: mobile telephone, smart phone, playstation, iPad, TV, remote desktop computer, game console, tablet, mobile e.g. laptop or other computer terminal, embedded remote unit. The methods and systems shown and described herein may be applicable to protocols which are not identical to LTE but have relevant features in common with or analogous to LTE.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether. Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Features of the present invention, including operations, which are described in the context of separate embodiments may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A method for converting a conventional cellular network into a private cellular network, wherein the conventional network includes nodes equipped with conventional modems operating in accordance with a cellular communication protocol, the method comprising:

coupling a device to each node in the conventional network, which is desired to belong to the private cellular network, and not to any nodes in the conventional network, which are not desired to belong to the private cellular network;

wherein the device stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, a device associated with a transmitting node desired to belong to the private network, uses a processor to determine which of the first orthogonal sequences is being used, translate the first orthogonal sequence being used using the stored one-to-one correspondence into one of the second orthogonal sequences, and use the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the device but not to modems not associated with the device such that only modems associated with the device can synchronize themselves to the private network and modems not associated with the device cannot synchronize themselves to the private network.

2. The method according to claim 1 wherein a non-private network supporting mode is also provided, in which a modem, when transmitting, uses the hard-coded sequence, not the non-hard-coded sequence in one-to-one correspondence therewith, to transmit synchronization signals.

3. The method according to claim 1 wherein a combined mode which supports both a private network and a public network is provided, and wherein a modem, when transmitting, uses, in parallel, both a hard-coded sequence, and the non-hard-coded sequence in one-to-one correspondence therewith, to transmit synchronization signals.

4. The method according to claim 1 wherein the device includes Primary Synchronization Signal (PSS) and Secondary Synchronization Signal (SSS) functionality and wherein the device and the standard PSS and SSS have the same networking information.

5. The method according to claim 1 wherein the device includes Primary Synchronization Signal (PSS) and Secondary Synchronization Signal (SSS) functionality, and wherein the device and the standard PSS and SSS have the same PCI.

6. The method according to claim 1 wherein the device is configured for conversion of non-standard over-the-air control signals carrying LTE networking information, to standard signals that carry the same LTE networking information carried in the non-standard control signals, and wherein the LTE networking information carried by every specific LTE control signal is typically not changed by the device.

7. The method according to claim 1 wherein the functionality is stored in a module housed in a mechanical member, where the modem has an antenna and a board houses the modem and the antenna, and wherein the mechanical member is external to the board and includes an additional antenna.

8. The method according to claim 1 wherein the functionality is stored in a module housed in a mechanical member where the modem has an antenna and a board houses the modem and the antenna and wherein the mechanical member is mounted on the board intermediate to modem and the antenna.

9. The method according to claim 1 wherein the network information not changed by the device comprises a PCI parameter (Physical Cell ID parameter) as set by the network.

10. The method according to claim 9 wherein the device is configured to extract the PCI and then translate the non-standard PSS/SSS to standard PSS/SSS that carry the same PCI.

11. The method according to claim 1 wherein the device synchronizes itself through non-standard PSS SSS to a base station in the conventional network, thereby to maintain a capability to transmit standard PSS SSS, to a conventional modem coupled thereto.

12. The method according to claim 1 wherein the non-standard sequence transmission is from the same family as the standard transmission and therefore the conventional modem sees the non-standard transmission as white noise and wherein associated with the device identifies only the device's transmission and does not identify that some control signals, are coming from different sources.

13. A system for converting a conventional cellular network into a private cellular network, wherein the conventional network includes nodes equipped with conventional modems operating in accordance with a cellular communication protocol, the system comprising:

a device, configured to be in data communication with individual nodes, thereby to enable the device to be in data communication with any individual node in the conventional network, which is desired to belong to the private cellular network, and not to nodes in the conventional network, which are not desired to belong to the private cellular network;

wherein the device includes a processor coupled to computer memory and stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, the processor when in data communication with a transmitting node, determines which of the first orthogonal sequences is being used, translates the first orthogonal sequences being used, using the stored one-to-one correspondence, into one of the second orthogonal sequences, and uses the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the device but not to modems not associated with the device such that only modems associated with the device can synchronize themselves to the private network and modems not associated with the device cannot synchronize themselves to the private network.

14. The system according to claim 13 wherein the device is configured to be coupled to nodes.

15. A computer program product, comprising a non-transitory tangible computer readable medium having computer readable program code embodied therein, said computer readable program code adapted to be executed to implement a method for converting a conventional cellular network into a private cellular network, wherein the conventional network includes nodes equipped with conventional modems operating in accordance with a cellular communication protocol, the method comprising:

coupling a device to each node in the conventional network, which is desired to belong to the private cellular network, and not to any nodes in the conventional network, which are not desired to belong to the private cellular network;

wherein the device stores second orthogonal sequences which differ from the first orthogonal sequences hence are not hard-coded in the conventional modems, and wherein the device stores a one-to-one correspondence enabling translation of each of the second orthogonal sequences, to one of the first sequences hard-coded in the modems, and wherein, at least when in a private network supporting mode, a device associated with a transmitting node desired to belong to the private network, uses a processor to determine which of the first orthogonal sequences is being used, translate the first orthogonal sequence being used using the stored one-to-one correspondence into one of the second orthogonal sequences, and use the translated sequence to transmit a synchronization signal, thereby to transmit a synchronization signal which uses one of the second orthogonal sequences, that are not hard-coded in protocol modems, thereby to transmit a synchronization signal which is noticeable and understandable to modems associated with the device but not to modems not associated with the device such that only modems associated with the device can synchronize themselves to the private network and modems not associated with the device cannot synchronize themselves to the private network.

* * * * *